(12) United States Patent
Katsuta

(10) Patent No.: US 10,429,973 B2
(45) Date of Patent: Oct. 1, 2019

(54) INPUT DETECTION DEVICE

(71) Applicant: Japan Display Inc., Tokyo (JP)

(72) Inventor: Tadayoshi Katsuta, Tokyo (JP)

(73) Assignee: Japan Display Inc., Tokyo (JP)

( * ) Notice: Subject to any disclaimer, the term of this patent is extended or adjusted under 35 U.S.C. 154(b) by 157 days.

(21) Appl. No.: 15/672,893

(22) Filed: Aug. 9, 2017

(65) Prior Publication Data

US 2018/0046296 A1 Feb. 15, 2018

(30) Foreign Application Priority Data

Aug. 10, 2016 (JP) .................. 2016-158228

(51) Int. Cl.
| | |
|---|---|
| *G06F 3/041* | (2006.01) |
| *G02F 1/1333* | (2006.01) |
| *G02F 1/1343* | (2006.01) |
| *G06F 3/0354* | (2013.01) |
| *G06F 3/044* | (2006.01) |
| *G06F 3/046* | (2006.01) |

(52) U.S. Cl.
CPC .......... *G06F 3/0412* (2013.01); *G02F 1/1343* (2013.01); *G02F 1/13338* (2013.01); *G06F 3/03545* (2013.01); *G06F 3/044* (2013.01); *G06F 3/046* (2013.01); *G06F 3/0416* (2013.01); *G06F 2203/04106* (2013.01)

(58) Field of Classification Search
CPC ............... G02F 1/13338; G02F 1/1343; G06F 3/03545; G06F 3/044
See application file for complete search history.

(56) References Cited

U.S. PATENT DOCUMENTS

| | | | |
|---|---|---|---|
| 6,239,788 B1 * | 5/2001 | Nohno | G06F 3/0412 178/18.03 |
| 2007/0124515 A1 | 5/2007 | Ishikawa et al. | |
| 2011/0248934 A1* | 10/2011 | Yeh | G06F 3/044 345/173 |
| 2014/0152621 A1* | 6/2014 | Okayama | G06F 3/0416 345/174 |
| 2014/0253826 A1* | 9/2014 | He | G06F 1/1643 349/12 |
| 2016/0250875 A1* | 9/2016 | Tarnowski | H05K 3/1275 345/173 |

FOREIGN PATENT DOCUMENTS

| | | |
|---|---|---|
| JP | H10-049301 A | 2/1998 |
| JP | 2005-352572 A | 12/2005 |
| JP | 2006-085488 A | 3/2006 |
| JP | 2006-085490 A | 3/2006 |

* cited by examiner

*Primary Examiner* — Abbas I Abdulselam
(74) *Attorney, Agent, or Firm* — K&L Gates LLP

(57) ABSTRACT

The input detection device includes: a line having an end to which a driving signal is supplied and extending in a first direction; a plurality of drive electrodes extending in a second direction intersecting the first direction and arranged in parallel in the first direction; a selecting drive circuit selecting the drive electrode from the plurality of drive electrodes and connecting an end of the selected drive electrode to the line; a driving signal circuit supplying the driving signal to the end of the line; and a plurality of line patterns connected to each drive electrode. A line density of line patterns connected to a drive electrode connected to be close to the end of the line is smaller than a line density of line patterns connected to another drive electrode connected to be far from the end of the line.

11 Claims, 19 Drawing Sheets

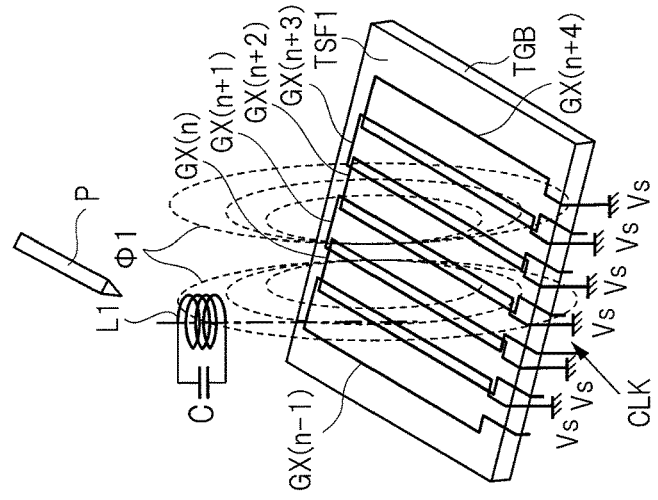
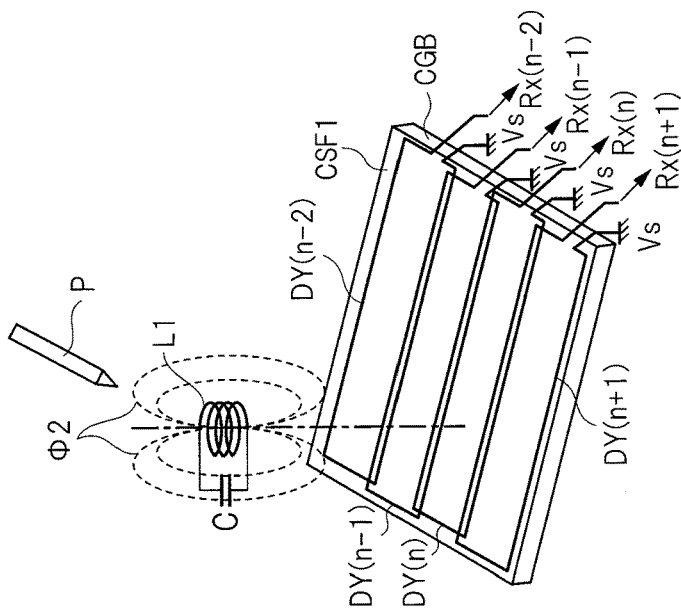
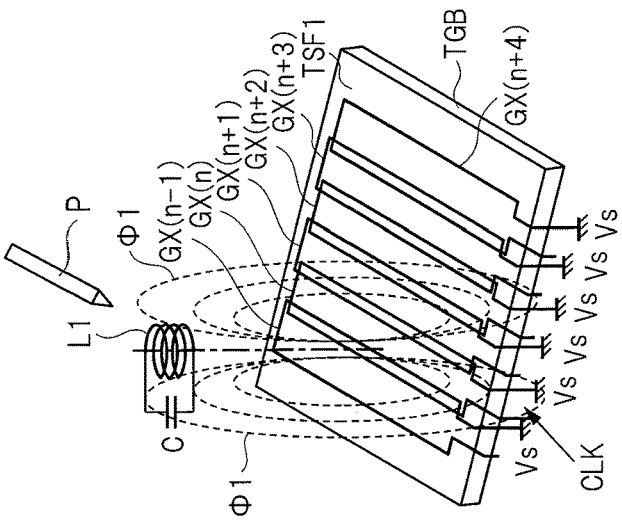

FIG. 11
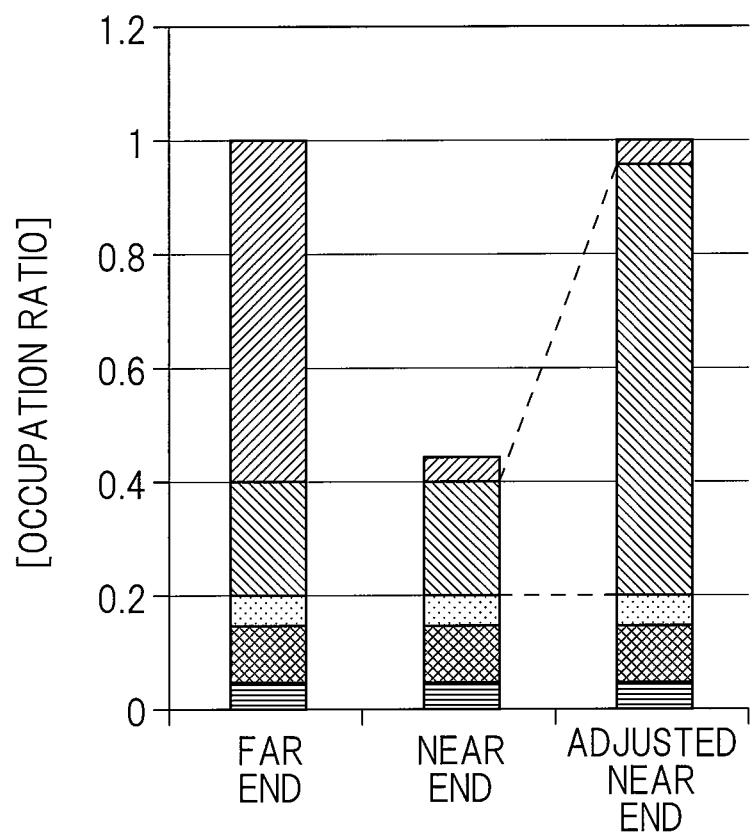
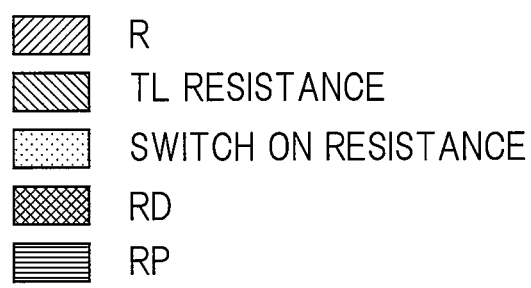

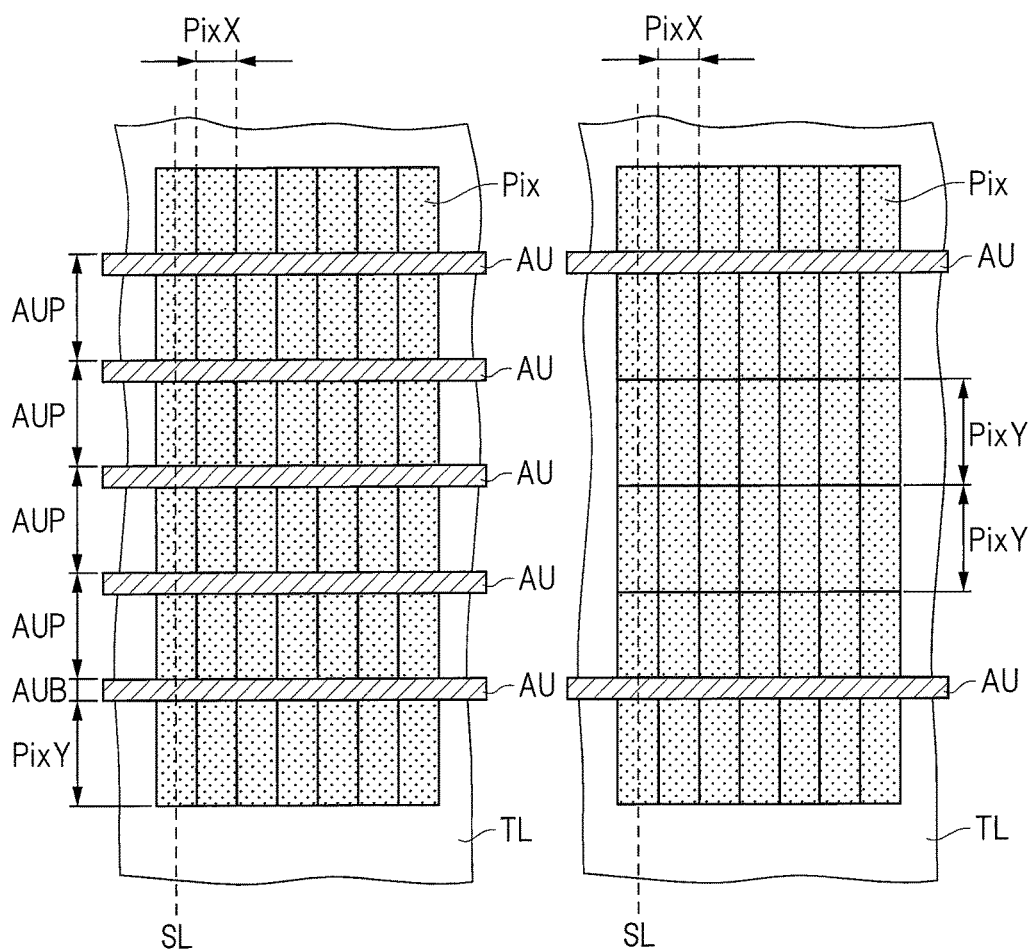

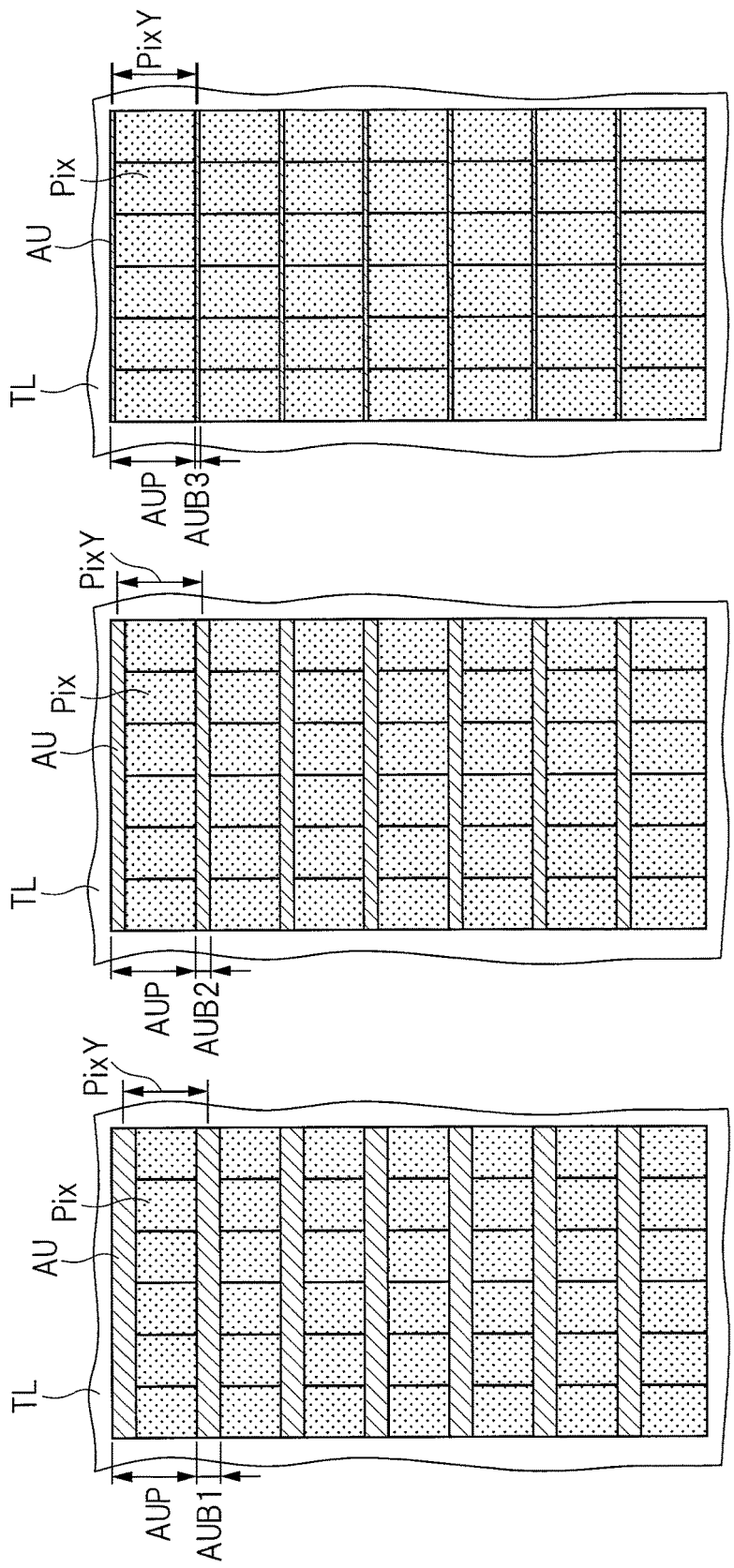

INPUT DETECTION DEVICE

CROSS-REFERENCE TO RELATED APPLICATION

The present application claims priority from Japanese Patent Application No. 2016-158228 filed on Aug. 10, 2016, the content of which is hereby incorporated by reference into this application.

TECHNICAL FIELD OF THE INVENTION

The present invention relates to an input detection device. More particularly, the present invention relates to an input detection device with a touch detection function capable of detecting that an external object is close to the device.

BACKGROUND OF THE INVENTION

In recent years, as an input detection device, attention has been paid to an input detection device with a touch detection function, which is so called touch panel, capable of detecting that an external object is close to (hereinafter, also in contact with) the device. A touch panel is mounted on a display apparatus such as a liquid crystal display apparatus or integrated with a liquid crystal display apparatus so as to be provided as a display apparatus with a touch detection function.

As the external object, a touch panel enabled to use, for example, a pen is known. By enabling the touch panel to use a pen, for example, a small region can be assigned or hand-written characters can be input. Various techniques to detect the touch by a pen are known. As one of the various techniques, an electromagnetic induction system is known. In the electromagnetic induction system, high accuracy and high handwriting pressure detection accuracy can be achieved, and a hovering detection function in a state in which an external object is separated from the touch panel surface can be also achieved, and therefore, the system is a leading technique as the technique to detect the touch by a pen.

A touch detecting device capable of detecting a finger, etc., as the external object is known. In this case, an object to be detected is different from the pen, and therefore, a system different from the electromagnetic induction system is employed for the touch detection technique. For example, systems of detecting optical change, resistance value change, or electric field change, caused by the finger touch, etc., are cited. As the system of detecting the electric field change among these systems, for example, an electrostatic capacitive system utilizing a capacitance is cited. This electrostatic capacitive system has a relatively simple structure and less power consumption, and therefore, is used for a portable information terminal, etc.

The technique related to the touch panel of the electromagnetic induction system is described in, for example, Japanese Patent Application Laid-Open Publication No. H10-49301 (Patent Document 1).

SUMMARY OF THE INVENTION

In an electromagnetic induction method, an input detection device is provided with, for example, a coil for generating a magnetic field (hereinafter also referred to as a magnetic field generation coil) and a coil for detecting a magnetic field (hereinafter also referred to as a magnetic field detection coil). Inside a pen which is an external object, a coil and a capacitive element which configures a resonance circuit are embedded. The coil in the pen generates an induced voltage by the magnetic field generated by the magnetic field generation coil, so that the capacitive element is charged. The magnetic-field detection coil detects the magnetic field generated by the coil in the pen in accordance with a charge amount stored in the capacitive element. Thus, it can be detected whether the pen is in close to the device or not.

In order to extract a position (region) to which the pen is in close, the input detection device includes a plurality of magnetic field generation coils arranged at different positions from one another, and the magnetic field generation coils are driven by a magnetic-field driving signal so as to generate magnetic fields at different timings from one another. Since the magnetic field generation coils are arranged at different positions from one another, when an arrangement of the magnetic field generation coil and a driving signal circuit which generates the magnetic-field driving signal is viewed in a plan view, the magnetic field generation coil which is in close to the driving signal circuit and the magnetic field generation coil which is far from the driving signal circuit exist. Thus, a line which supplies the driving signal from the driving signal circuit to the far magnetic field generation coil becomes longer than a line which supplies the driving signal to the close magnetic field generation coil. By the long line, a resistance caused by the line becomes high. Therefore, a current flowing when a magnetic field is generated in the far magnetic field generation coil adversely becomes smaller than a current flowing through the close magnetic field generation coil. The magnetic field generated by the magnetic field generation coil becomes strong or weak depending on whether the flowing current is large or small. Therefore, in the input detection device, the strength of the generated magnetic field varies depending on the position (region). That is, the strength of the generated magnetic field changes depending on the position in a plane where the touch is detected.

When the magnetic field generated depending on the position becomes strong or weak, the charge amount stored in the capacitive element in the pen also changes depending on the touched position. As a result, the magnetic field generated by the coil in the pen also becomes strong or weak depending on the position. Therefore, detection sensitivity undesirably changes depending on the position.

Although Patent Document 1 describes the technique related to the touch panel of the electromagnetic induction method, it neither describes nor recognizes the change in the detection sensitivity depending on the position.

SUMMARY OF THE INVENTION

An object of the present invention is to provide an input detection device capable of suppressing the change in the detection sensitivity depending on the position.

An input detection device according to an aspect of the present invention includes a substrate, a line whose end is connected to a driving signal circuit that supplies a driving signal and which extends in a first direction on the substrate, a plurality of drive electrodes arranged in the first direction on the substrate, a selecting drive circuit which connects an end of a drive electrode selected from the plurality of drive electrodes to the line when it is detected that an external object is in close based on a change of a magnetic field, and a plurality of first line patterns which are superimposed on the plurality of respective drive electrodes in a plan view and which are electrically connected to the drive electrode. Here, a line density of the first line patterns connected to the drive electrode in close to the end of the line connected to the driving signal circuit is smaller than a line density of the first line patterns connected to the drive electrode far from the end of the line connected to the driving signal circuit.

BRIEF DESCRIPTIONS OF THE DRAWINGS

FIG. 2A to FIG. 2C are explanatory diagrams showing a principle of magnetic-field detection;

FIG. 11 is a diagram showing contents of a combined resistance of a current path according to the first embodiment;

FIGS. 16A and 16B are plan views each showing a plane of the display region according to the first embodiment;

FIGS. 17A to 17C are plan views each showing a plane of a display region according to a second embodiment;

DESCRIPTIONS OF THE PREFERRED EMBODIMENTS

Figure 1A:
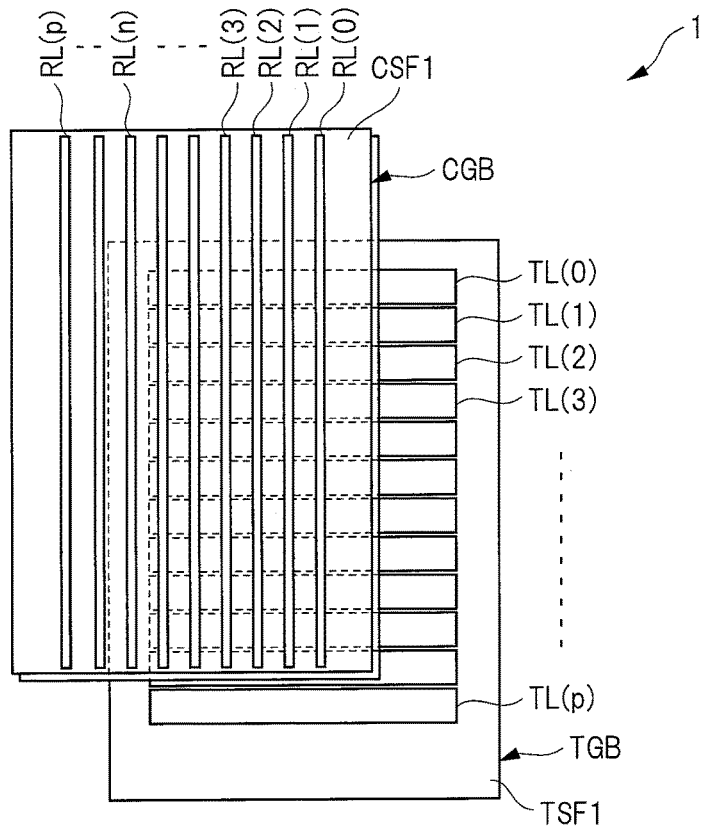
FIG. 1A and FIG. 1B are a plan view and a cross-sectional view showing a configuration of a display apparatus.

The following is explanation for each embodiment of the present invention with reference to drawings. Note that disclosure is merely one example, and appropriate change with keeping the concept of the present invention which can be easily thought up by those who skilled in the art is obviously contained in the scope of the present invention. Also, in order to make the clear description, the drawings are illustrated more schematically for a width, a thickness, a shape, and others of each portion than those in an actual aspect in some cases. However, they are merely examples, and do not limit the interpretation of the present invention.

In the present specification and each drawing, similar elements to those described earlier for the already-described drawings are denoted by the same reference characters, and detailed description for them is appropriately omitted in some cases. The following explanation will be made while a liquid crystal display apparatus with a touch detection function is exemplified as an input detection device. However, the display apparatus is not limited to this. For example, the input detection device may be an OLED display apparatus with a touch detection function, a touch panel without a display function, or others.

(First Embodiment)

First embodiment provides a liquid crystal display apparatus with a touch detection function (hereinafter, referred to also as display apparatus) capable of detecting both of a touch by a pen and a touch by a finger. First, a basic configuration of a display apparatus will be explained, and then, principles of a magnetic-field detection for detecting the touch by a pen (hereinafter, referred to also as magnetic field touch detection) and an electric-field detection for detecting the touch by a finger (hereinafter, referred to also as electric field touch detection) will be explained based on this basic configuration.

<Basic Configuration of Display Apparatus>

Figure 1B:
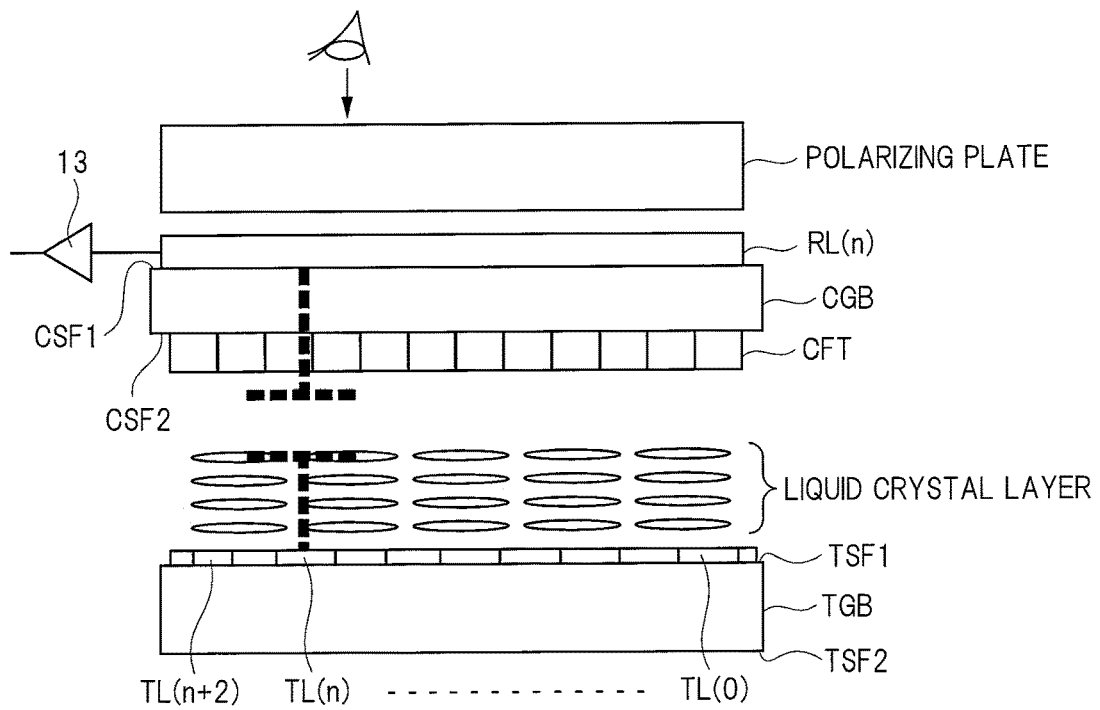

FIG. 1A and FIG. 1B are views that schematically show a configuration of a display apparatus. In FIG. 1A and FIG. 1B, a reference character 1 indicates the display apparatus, FIG. 1A is a plan view showing a plane of the display apparatus 1, and FIG. 1B is a cross-sectional view showing a cross section of the display apparatus 1. The display apparatus 1 is provided with a TFT (Thin Film Transistor) glass substrate (hereinafter, referred to also as insulating first substrate or simply first substrate) TGB, a layer stacked on the first substrate TGB, a color filter CFT, a CF (color filter) glass substrate (hereinafter, referred to also as insulating second substrate or simply second substrate) CGB, and a layer stacked on the second substrate CGB.

In FIG. 1A, reference characters TL(0) to TL(p) indicate drive electrodes configured by layers formed on a first main surface TSF1 of the first substrate TGB. Moreover, reference characters RL(0) to RL(p) indicate detection electrodes configured by layers formed on a first main surface CSF1 of the second substrate CGB. In FIG. 1A, for easiness of understanding, the first substrate TGB and the second substrate CGB are separately illustrated. However, practically, the first main surface TSF1 of the first substrate TGB and the second main surface CSF2 of the second substrate CGB are opposed to each other across a liquid crystal layer as shown in FIG. 1B.

A plurality of layers, the liquid crystal layer, and the like, are sandwiched between the first main surface TSF1 of the first substrate TGB and the second main surface CSF2 of the second substrate CGB. FIG. 1B shows only the drive electrodes TL(0) to TL(n+2), the liquid crystal layer and the color filter CFT, sandwiched between the first main surface TSF1 and the second main surface CSF2. Moreover, as shown in FIG. 1A, on the first main surface CSF1 of the second substrate CGB, the plurality of detection electrodes RL(0) to RL(p) and a polarizing plate are arranged. Furthermore, in FIG. 1B, a reference character 13 indicates a unit detection circuit connected to the detection electrode RL(n).

In the present specification, as shown in FIG. 1B, a state when the display apparatus 1 is viewed from the normal direction of the first main surfaces CSF1 and TSF1 is explained as a plan view. In the plan view, the drive electrodes TL(0) to TL(p) extend in a row (horizontal) direction and are arranged in parallel with one another in a column (vertical) direction on the first main surface TSF1 of the first substrate TGB as shown in FIG. 1A. Moreover, on the first main surface CSF1 of the second substrate CGB, the detection electrodes RL (0) to RL (p) extend in the column (vertical) direction and are arranged in parallel with one another in the row (horizontal) direction as shown in FIG. 1A.

The second substrate CGB, the liquid crystal layer and others are interposed between the drive electrodes TL(0) to TL(p) and the detection electrodes RL(0) to RL(p). For this reason, while the drive electrodes TL(0) to TL(p) and the detection electrodes RL(0) to RL(p) intersect with each other in a plan view, those electrodes are electrically separated from each other. Since capacitances exist between the drive electrodes and the detection electrodes, each capacitance is shown by a broken line as a capacitive element in FIG. 1B.

In a plan view, it is desirable to arrange the drive electrodes TL(0) to TL(p) and the detection electrodes RL(0) to RL(p) so as to be orthogonal to each other. However, in a plan view, the drive electrodes and the detection electrodes may intersect with each other while tilting. Therefore, in the following explanation, it should be understood that the term "being orthogonal" includes the term "intersecting".

<Principle of Magnetic-Field Detection>

FIG. 2 is an explanatory diagram showing the principle of magnetic-field detection. The period of magnetic-field detection is composed of a magnetic-field generation period in which a magnetic field is generated and a magnetic-field detection period in which the magnetic field is detected. FIG. 2A and FIG. 2C show operations during the magnetic-field generation period, and FIG. 2B shows an operation during the magnetic-field detection period. For convenience of explanation, each of FIG. 2A to FIG. 2C shows a state obtained by rotating FIG. 1A by 90 degrees.

In the magnetic-field generation period, ends of predetermined drive electrodes of the drive electrodes TL(0) to TL(p) are electrically connected to each other. Further, a predetermined voltage signal (constant-potential signal, for example, ground voltage Vs) and a magnetic-field driving signal are supplied to the drive electrodes the ends of which are connected. For example, the right ends of the drive electrodes TL(0) and TL(2) shown in FIG. 1 are electrically connected to each other. Thus, the drive electrodes TL(0) and TL(2) which are arranged in parallel with each other are connected in series with each other. Moreover, the ground voltage Vs is supplied to the left end of the drive electrode TL(0), and the magnetic-field driving signal is also supplied to the left end of the drive electrode TL(2). Here, the magnetic-field driving signal is a signal whose voltage periodically changes. By the drive electrodes TL(0) and TL(2), a magnetic-field generation coil having a region between these drive electrodes TL(0) TL(2) is configured, and this magnetic-field generation coil generates the magnetic field inside in accordance with the voltage change of the magnetic-field generation signal.

In FIG. 2A, a reference character GX(n−1) indicates a magnetic-field generation coil configured by the drive electrodes TL(0) and TL(2). As similar to the magnetic field generation coil GX(n−1), reference characters GX(n) to GX(n+4) indicate magnetic-field generation coils configured by the drive electrodes TL(1), TL(3) to TL(p).

In FIG. 2A, reference characters "C" and "L1" indicate a capacitive element and a coil that are embedded in a pen "P". The capacitive element C and the coil L1 are connected with each other so as to configure a resonance circuit. During the magnetic-field generation period, the ground voltage Vs is supplied to one end of each of the magnetic-field generation coils GX(n−1) to GX(n+3). A magnetic-field driving signal CLK is supplied to the other end of the magnetic-field generation coil GX(n). Thus, the magnetic-field generation coil GX(n) generates a magnetic field ϕ1 in accordance with the voltage change of the magnetic-field driving signal CLK. When the pen P is close to the magnetic-field generation coil GX(n), the magnetic-field generation coil GX(n) and the coil L1 are electromagnetically coupled to each other, and an induced voltage is generated in the coil L1 based on mutual induction by the magnetic field ϕ1, so that the capacitive element C is charged.

Next, the sequence proceeds to the magnetic-field detection period shown in FIG. 2B. In the magnetic-field detection period, the magnetic field is detected by using the detection electrodes RL(0) to RL(p). Each of the detection electrodes RL(0) to RL(p) has a pair of ends. The upper ends of predetermined detection electrodes of the detection electrodes RL(0) to RL(p) are electrically connected to each other. For example, the upper ends of the detection electrodes RL(0) and RL(3) shown in FIG. 1 are electrically connected to each other. Thus, the detection electrodes RL(0) and RL(3) arranged in parallel with each other are connected in series with each other. In the magnetic-field detection period, the predetermined voltage Vs is supplied to lower end of the detection electrode RL(3), and lower end of the detection electrode RL(0) is connected to the unit detection circuit. Thus, a magnetic-field detection coil having a region (formed region) between the detection electrodes RL(0) and RL(3) is formed, and the magnetic field caused from the pen P is detected by this magnetic-field detection coil.

In FIG. 2B, a reference character DY(n−2) indicates a magnetic-field detection coil configured by the detection electrodes RL(0) and RL(3), and reference characters DY(n−1) to DY(n+1) similarly indicate magnetic-field detection coils configured by the detection electrodes RL(2) to RL(p). During the magnetic-field detection period, the predetermined voltage Vs is supplied to one lower end of each of the magnetic-field detection coils DY(n−1) to DY(n+1), and each of signals Rx(n−2) to Rx(n+1) on the other lower end thereof is supplied to the unit detection circuit.

If the capacitive element C is charged in the magnetic-field generation period, the coil L1 generates a magnetic field ϕ2, that changes in response to a resonance frequency of the resonance circuit, in accordance with the charge in the capacitive element C. In FIG. 2B, the center (indicated by a one-dot chain line) of the coil L1 is located inside the magnetic-field detection coil DY(n). For this reason, the magnetic-field detection coil DY(n) and the coil L1 are electromagnetically coupled, so that an induced voltage is generated in the magnetic-field detection coil DY(n) by mutual induction between these coils. As a result, the signal Rx(n) on the other end of the magnetic-field detection coil DY(n) is changed in response to the charge amount in the capacitive element C. The unit detection circuit connected to the magnetic-field generation coil DY(n) outputs the change in the signal Rx(n) as a detection signal. Thus, it can be detected whether or not the pen P is closely located (or touched), or coordinates of the pen P can be detected. Moreover, since the detection signal is changed in response to the charge amount, a distance from the pen P can be obtained.

FIG. 2C shows the magnetic-field generation period to which the sequence proceeds successively from the state of FIG. 2B. A difference from FIG. 2A is that the magnetic-field driving signal CLK is supplied to the magnetic-field generation coil GX(n+1). Since the position of the pen P has not been changed, the induced voltage is not generated in the coil L1 during the magnetic-field generation period shown in FIG. 2C, so that the capacitive element C is not charged. Thus, during the magnetic-field detection period to which the sequence proceeds successively from the state of FIG. 2C, it is detected that the pen P is not closely located. Thereafter, similarly, the pen P is detected.

<Principle of Electric-Field Detection>

Figure 3A:
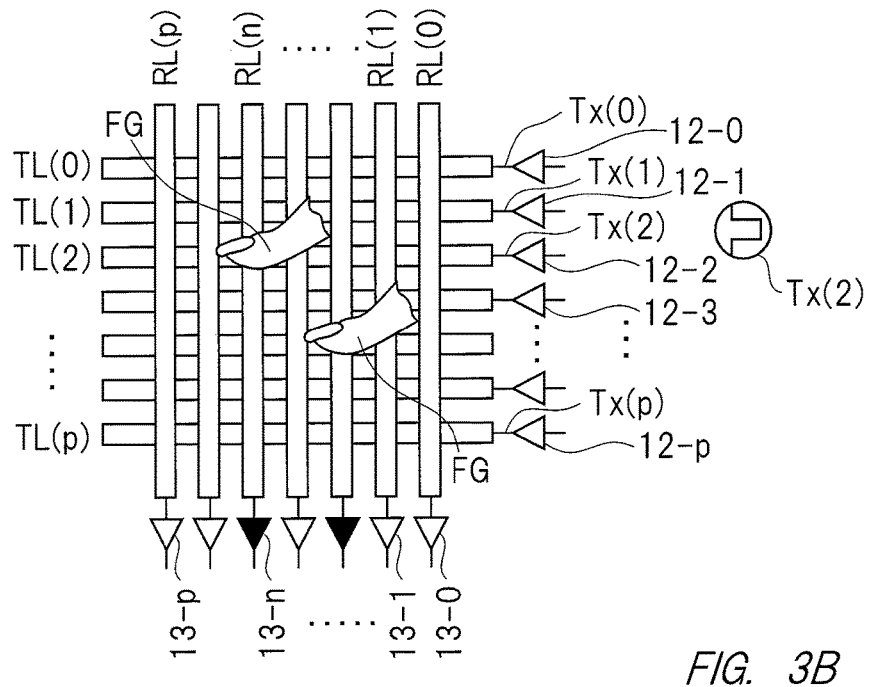
FIG. 3A to FIG. 3C are explanatory diagrams showing a principle of electric-field detection.
Figure 3B:
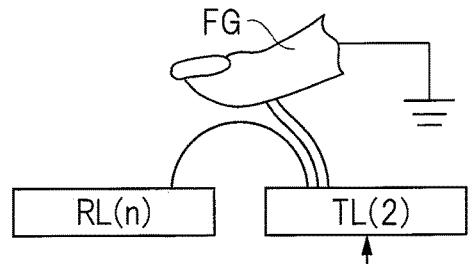
Figure 3C:
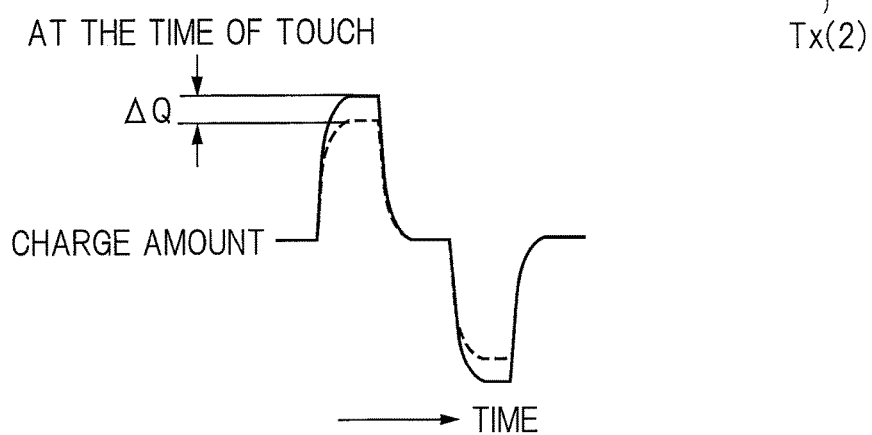

FIG. 3A to FIG. 3C are explanatory diagrams showing the principle of the electric-field detection. In FIG. 3A, each of reference characters 12-0 to 12-$p$ indicates a unit drive circuit that outputs an electric-field driving signal. Each of reference characters 13-0 to 13$p$ indicates a unit detection circuit. Moreover, in FIG. 3A, a pulse signal surrounded by a solid-line circle indicates a waveform of an electric-field driving signal Tx(2) to be supplied to the drive electrode TL(2). A finger as the external object is indicated by a reference character "FG".

When the electric-field driving signal Tx(2) is supplied to the drive electrode TL(2), an electric field is generated between the drive electrode TL(2) and the detection electrode RL(n) that is orthogonal to the drive electrode TL(2) as shown in FIG. 3B. At this time, when the finger FG is touching the vicinity of the drive electrode TL(2), an electric field is also generated between the finger FG and the drive electrode TL(2). For this reason, the electric field generated between the drive electrode TL(2) and the detection electrode RL(n) is reduced. Thus, the charge amount between the drive electrode TL(2) and the detection electrode RL(n) is reduced. As a result, as shown in FIG. 3C, when the finger FG is touching, the charge amount which is generated in response to the supply of the driving signal Tx(2) is smaller by $\Delta Q$ than that when the finger FG is not touching. The difference in the charge amount is supplied to the unit detection circuit 13-$n$ as a difference in voltages, and is output as a detection signal.

Also in other drive electrodes, the signal voltage change caused depending on whether the finger FG is touching or not is similarly generated in the detection electrodes RL(0) to RL(n) by the supply of the electric-field driving signal, and is output as the detection signal. Therefore, it can be detected whether the finger FG is touching or not, and the coordinates of the touching can be detected.

As described above, in the detection of the magnetic field, the magnetic-field driving signal is supplied to the selected drive electrode of the drive electrodes TL(0) to TL(p). Moreover, in the detection of the electric field, the electric-field driving signal is supplied to the selected drive electrode thereof. On the other hand, in the display, the display driving signal is supplied to the drive electrodes TL(0) to TL(p). Since the drive electrodes TL(0) to TL(p) are set to the same voltage by the display driving signal, the drive electrodes TL(0) to TL(p) can be regarded as a single common electrode.

<Overview of Display Apparatus>

Figure 4:
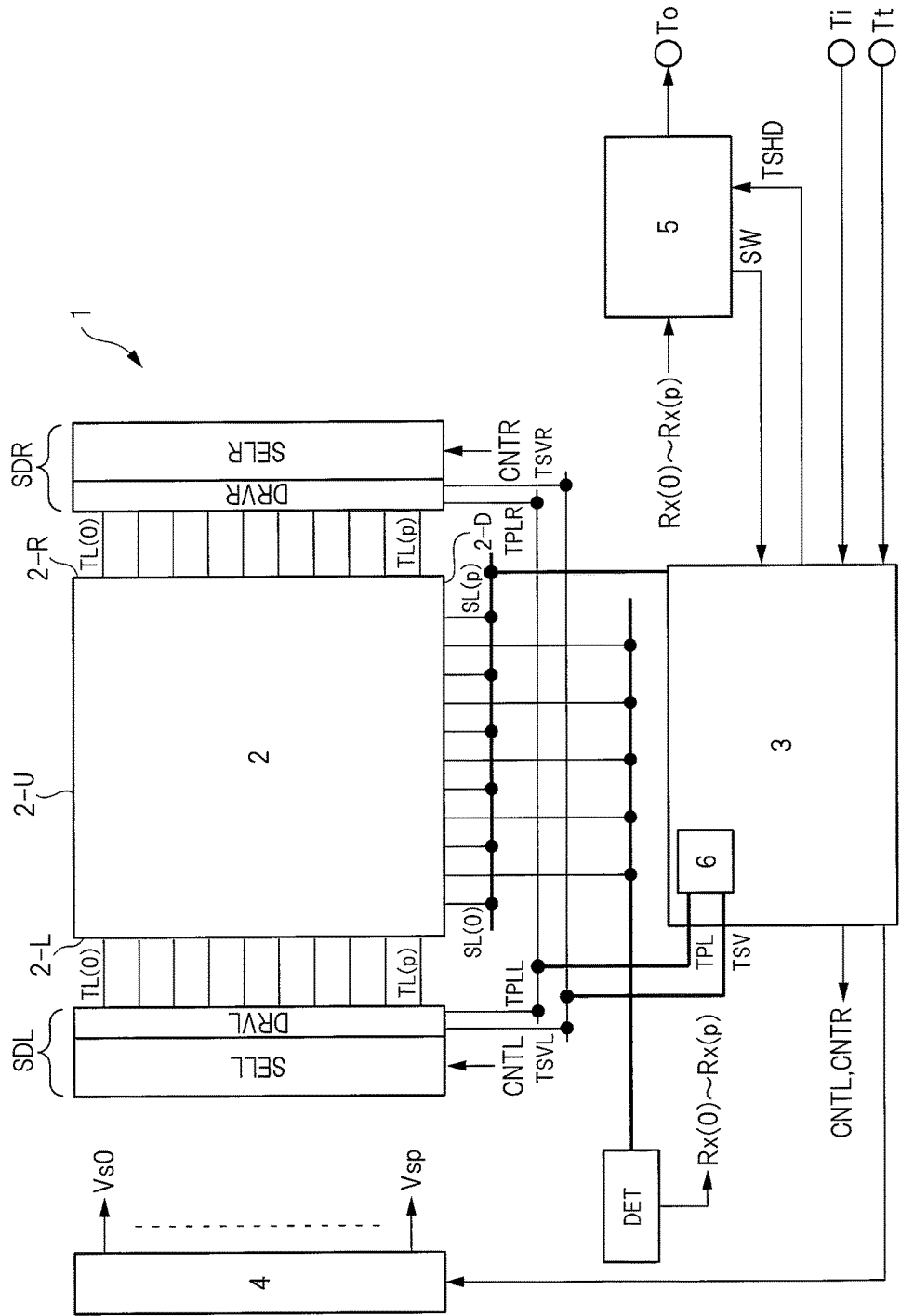
FIG. 4 is a block diagram showing a configuration of the display apparatus according to a first embodiment.

FIG. 4 is a block diagram showing the configuration of the display apparatus 1 according to the first embodiment. In FIG. 4, the display apparatus 1 includes a display panel (liquid crystal panel), a control device 3, a gate driver 4, and a touch control device 5. The display apparatus 1 also includes selecting drive circuits SDL and SDR, and a detection circuit DET. The display panel includes a display region (display portion) where the display is performed and a peripheral region (peripheral portion). From the viewpoint of the display, the display region is an active region, and the peripheral region surrounding the display region is a non-active region. In FIG. 4, a reference character 2 indicates the display region.

In the display region 2, a pixel array in which a plurality of pixels are arranged in a matrix form is provided. In the pixel array, a plurality of signal lines, a plurality of drive electrodes, a plurality of scan lines, and a plurality of detection electrodes are arranged. In the description with reference to FIG. 4, the signal lines SL(0) to SL(p) extend in a vertical direction (column direction) and are arranged in parallel in a horizontal direction (row direction). The drive electrodes TL(0) to TL(p) extend in the horizontal direction and are arranged in parallel in the vertical direction. Further, the scan lines extend in the horizontal direction and are arranged in parallel in the vertical direction. And, the detection electrodes extend in the vertical direction and are arranged in parallel in the horizontal direction. In this case, a pixel is arranged in a space formed by intersection between the plurality of signal lines and the plurality of scan lines. In a period of display (display period), pixels are selected by the scan lines. To the selected pixels, the voltage of the signal line and the voltage of the drive electrode at that time are applied. And, display is performed in accordance with a voltage difference between the signal line and the drive electrode.

The control device 3 receives a timing signal supplied to an external terminal Tt and image information supplied to an input terminal Ti, forms an image signal in accordance with the image information in the display, and supplies the image signal to the plurality of signal lines SL(0) to SL(p). Also, the control device 3 receives a timing signal supplied to the external terminal Tt and a control signal SW from the touch control device 5, and forms various signals. In FIG. 4, only signals required for the explanation are shown as representatives. That is, the control device 3 forms a synchronization signal TSHD and control signals CNTL and CNTR. Also, although not particularly limited, the control device 3 forms drive signals TPL and TSV. That is, the control device 3 includes a drive signal circuit 6 which forms the drive signals TPL and TSV.

The synchronization signal TSHD is a synchronization signal for identifying the display period during which the display is performed in the display region 2 and the touch detection period during which the touch detection (magnetic field touch detection and electric field touch detection) is performed. The control device 3 performs control so that the touch control device 5 operates during the touch detection period by the synchronization signal TSHD.

In the display period, the gate driver 4 forms scan line signals Vs0 to Vsp in accordance with a timing signal from the control device 3, and supplies the scan line signals Vs0 to Vsp to scan lines in the display region 2. In the display period, a pixel connected to a scan line to which a scan signal with a high level is supplied is selected, and this selected pixel displays an image in accordance with an image signal that is supplied to the signal line SL(0) to SL(p) at this time.

In the magnetic field touch detection and the electric field touch detection, the detection circuit DET detects the signal change in the detection electrodes RL(0) to RL(p), and outputs the change as the detection signals Rx(0) to Rx(p).

The touch control device 5 receives the detection signals Rx(0) to Rx(p). The touch control device 5 may also extract coordinates of the touched position, and output the coordinates from an external terminal To. The touch control device 5 also outputs the control signal SW, and receives the synchronization signal TSHD and operates in synchronization with the control device 3.

The display region 2 has sides 2-U, 2-D parallel to the row of the pixel array and sides 2-R, 2-L parallel to the column of the pixel array. Here, the side 2-U and the side 2-D are sides opposite to each other, and the plurality of drive electrodes and the plurality of scan lines in the pixel array are arranged between the two sides. The side 2-R and the side 2-L are also sides opposite to each other, and the plurality of signal lines and the plurality of detection electrodes in the pixel array are arranged between the two sides.

The selecting drive circuits SDL and SDR include selection circuits SELL and SELR and drive circuits DRVL and DRVR, respectively. In the magnetic field touch detection and the electric field touch detection, the selection circuits SELL and SELR form selection signals for selecting the drive electrodes from the drive electrodes TL(0) to TL(p) based on the control signals CNTL and CNTR, respectively.

In FIG. 4, each of reference characters TPLL, TPLR, TSVL, and TSVR indicates a line. The lines TPLL and TSVL extend along the side 2-L of the display region 2, and penetrates the drive circuit DRVL. Similarly, the lines TPLR and TSVR extend along the side 2-R of the display region 2, and penetrates the drive electrode DRVR. The drive circuit DRVL corresponds to the selection circuit SELL, and connects the drive electrode designated by the selection signal from the selection circuit SELL to the line TPLL or TSVL in the magnetic field touch detection and the electric field touch detection. Similarly, the drive circuit DRVR corresponds to the selection circuit SELR, and connects the drive electrode designated by the selection signal from the selection circuit SELR to the line TPLR or TSVR in the magnetic field touch detection and the electric field touch detection.

The driving signals TPL and TSV formed by a driving signal circuit 6 included in the control device 3 are supplied to respective ends of the lines TPLL, TPLR, TSVL and TSVR. Although described later, in the magnetic field touch detection, the driving signals TPL and TSV, which are propagated through the lines TPLL, TPLR, TSVL and TSVR, are supplied to the selected drive electrode via the drive circuit DRVL or DRVR to generate a magnetic field. In the electric field touch detection, the driving signal TSV, which propagates through the lines TSVL and TSVR, is supplied to the selected drive electrode via the drive circuit DRVL or DRVR to generate an electric field. In the present specification, each of the lines TPLL and TPLR is also referred to as a first line (or a second line), and each of the lines TSVL and TSVR is also referred to as a second line (or a first line) in some cases.

<Module Configuration of Display Apparatus 1>

Figure 5:
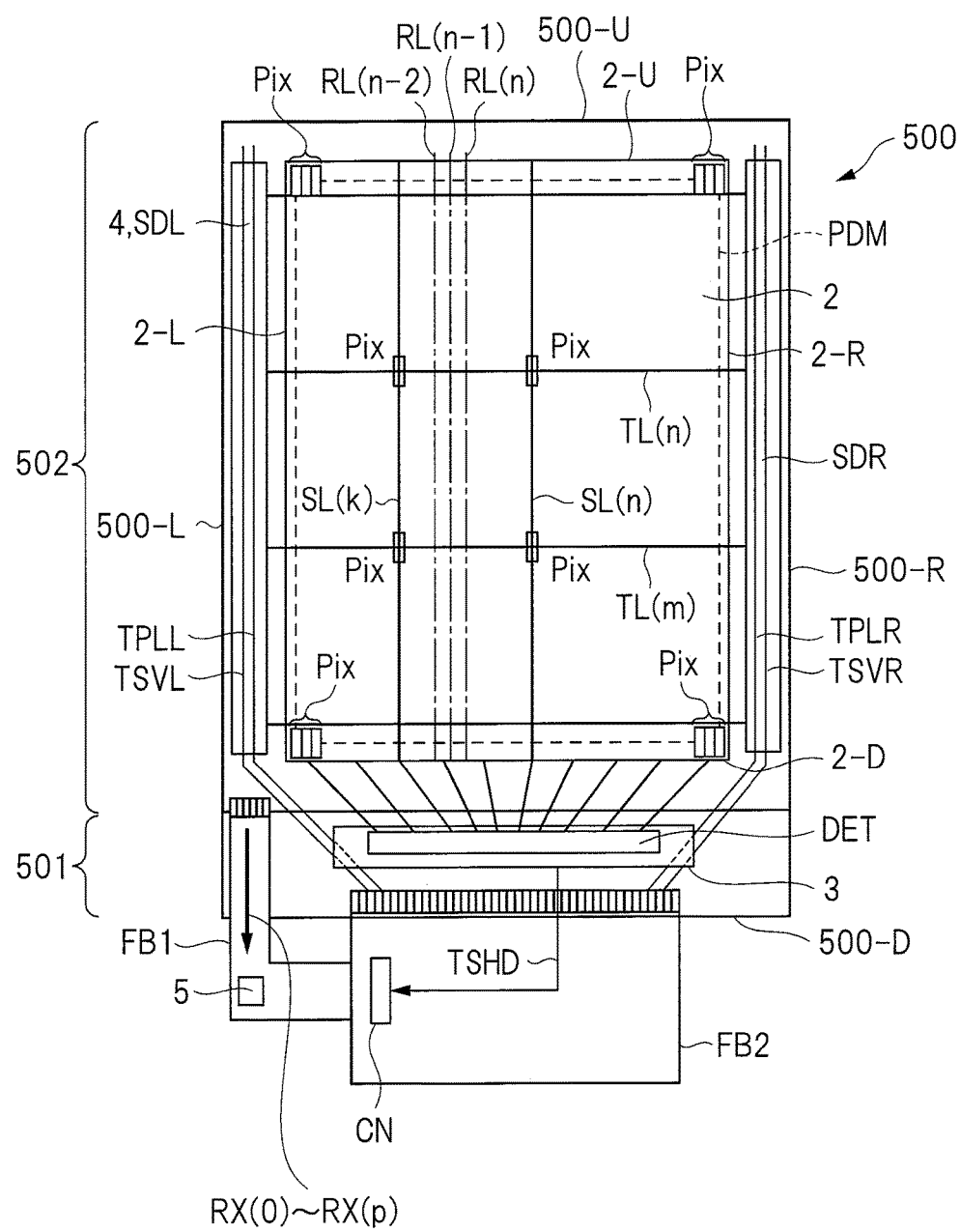
FIG. 5 is a plan view showing a configuration of a module according to the first embodiment.

FIG. 5 is a schematic plan view showing an overall configuration of a module 500 mounted with the display apparatus 1. Although schematically shown, FIG. 5 shows practical arrangement. In this drawing, a reference character 501 indicates a region of the first substrate TGB shown in FIG. 1, and a reference character 502 indicates a region where the first substrate TGB and the second substrate CGB are stacked. In the module 500, the first substrate TGB is integrated in the regions 501 and 502. Also, in the region 502, the second substrate CGB is mounted on the first substrate TGB so that the first main surface TSF1 of the first substrate TGB and the second main surface CSF2 of the second substrate CGB are opposite to each other. In FIG. 5, reference characters 500-U and 500-D indicate short sides of the module 500, and reference characters 500-L and 500-R indicate long sides of the module 500.

The gate driver 4 and the selecting drive circuit SDL shown in FIG. 4 are arranged in a region between the side 2-L of the display region 2 and the long side 500-L of the module 500 in the region 502. The selecting drive circuit SDR shown in FIG. 4 is arranged in a region between the side 2-R of the display region 2 and the long side 500-R of the module 500. The detection circuit DET and the control device 3 shown in FIG. 4 are arranged in a region between the side 2-D of the display region 2 and the short side 500-D in the region 502. The detection circuit DET is formed of lines and components formed on the first main surface TSF1. In a plan view, the control device 3 is mounted on the first substrate TGB so as to cover the detection circuit DET. Also, the lines and components configuring the selecting drive circuits SDL and SDR are also formed on the first main surface TSF1.

The detection signals Rx(0) to Rx(p) described in FIG. 4 are supplied to the touch control device 5 via lines in the flexible cable FB1. A flexible cable FB2 is connected to the region 501. Through a connector CN mounted on the flexible cable FB2, signals are transmitted/received between the touch control device 5 and the control device 3.

As described above, the display region 2 includes the pixel array in which a plurality of pixels are arranged in a matrix form. The pixel array has the plurality of drive electrodes TL(0) to TL(p) and the plurality of scan lines arranged along a row direction in the pixel array, and the plurality of signal lines SL(0) to SL(p) and the plurality of detection electrodes RL(0) to RL(p) arranged along a column direction in the pixel array. In FIG. 5, two drive electrodes TL(n) and TL(m), two signal lines SL(k) and SL(n), and three detection electrodes RL(n−2) to RL(n) are shown as an example. In FIG. 5, the horizontal direction is the row direction of the pixel array, and the vertical direction is the column direction of the pixel array. Therefore, the exemplified drive electrodes TL(n) and TL(m) extend in the horizontal direction and are arranged in parallel in the vertical direction. Further, the exemplified signal lines SL(k) and SL(n) extend in the vertical direction and are arranged in parallel in the horizontal direction, and the exemplified detection electrodes RL(n−2) to RL(n) extend in the vertical direction and are arranged in parallel in the horizontal direction. Note that the scan lines are omitted in FIG. 5. However, the scan lines extend in parallel to the exemplified drive electrodes TL(n) and TL(m).

In FIG. 5, the pixel array is indicated as a broken line PDM, and each of pixels arranged at four corners of the display region 2 among the plurality of pixels arranged in the pixel array PDM and each of pixel regions arranged at intersections between the exemplified drive electrodes and signal lines are shown as "Pix".

Each of the lines TPLL and TSVL shown in FIG. 4 extends in the vertical direction (the column direction in the pixel array) in a region between the long side 500-L of the module 500 and the side 2-L of the display region 2. Similarly, each of the lines TPLR and TSVR extends in the vertical direction (direction of the pixel array: first direction) in a region between the long side 500-R of the module 500 and the side 2-R of the display region 2. When each extension direction of the drive electrodes TL(0) to TL(p) extend, i.e., the horizontal direction is regarded as a second direction, the signal lines SL(0) to SL(p), the detection electrodes RL(0) to RL(p), and the lines TPLL, TPLR, TSVL, and TSVR extend in the first direction orthogonal to (including "intersecting") the second direction. At this time, the omitted scan lines extend along the second direction.

FIG. 4 shows an example in which the control device 3 forms the driving signals TPL and TSV. However, the present invention is not limited to this, and the driving signals may be formed by another circuit block or others. When the driving signals are formed by another circuit block, for example, the lines TPLL, TPLR, TSVL, and TSVR are connected to the lines inside the flexible cable FB2 on the first main surface TSF1 of the first substrate TGB, and are connected to another circuit block. In FIG. 5, a broken line shown in the control device 3 indicates a case in which the driving signals TPL and TSV are formed by another circuit block. That is, in the lines TPLL, TPLR, TSVL and TSVR through which the driving signals formed by another circuit block (a driving signal circuit) are transmitted, each portion covered by the control device 3 is indicated by a broken line.

<Outline of Magnetic Field Generation Period>

A principle in performing the magnetic-field detection using the drive electrodes has been described with reference to FIG. 2. For easily understanding, FIG. 2 shows an example in which a magnetic field generation coil is formed by electrically connecting the drive electrodes to each other. The present inventor has considered a configuration which generates a magnetic field without electrically connecting the drive electrodes to each other and has applied the configuration to the display apparatus 1. Before the display apparatus 1 is explained in more detail, magnetic field generation considered by the present inventor is described.

FIG. 6 is a plan view for explaining an operation in the magnetic field generation period. In FIG. 6, drive electrodes TL(n−4) to TL(n+5) are indicated as the drive electrodes. The drive electrodes TL(n−4) to TL(n+5) are arranged in parallel to one another when viewed in a plan view, and each of the drive electrodes has a pair of ends n1 and n2. Here, the one end n1 of each of the drive electrodes TL(n−4) to TL(n+5) is arranged along the side 2-L of the display region 2, and the other end n2 thereof is arranged along the side 2-R of the display region 2.

A period for the magnetic field touch detection (hereinafter also referred to as a magnetic field touch detection period) for detecting whether the pen P (FIG. 2) is touching a region of the drive electrode TL(n) or not will be described as an example. In the magnetic field touch detection period, the drive electrodes TL(n−3) to TL(n−1) and TL(n+1) to TL(n+3) are driven so that a driving state shown in FIG. 6A and a driving state shown in FIG. 6B occur a plurality of times including once during the magnetic field generation period.

During the magnetic field generation period, the pair of drive electrodes arranged so as to sandwich the drive electrode TL(n) are selected, and the selected pair of drive electrodes are driven so that currents respectively flowing through the drive electrodes are opposite to each other in direction. In FIG. 6, three adjacent drive electrodes are bundled in a plan view, and the bundled drive electrodes (hereinafter also referred to as bundle drive electrode) are used as a set of drive electrodes. That is, the drive electrodes TL(n−3) to TL(n−1) are bundled to form the bundle drive electrode, and the drive electrodes TL(n+1) to TL(n+3) are bundled to form the bundle drive electrode.

Figure 6A:
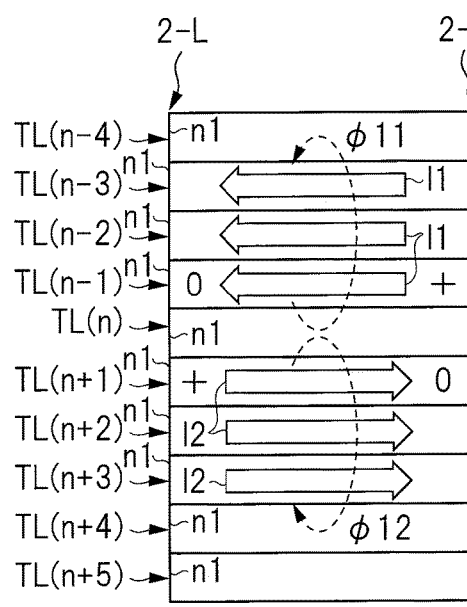
FIGS. 6A and 6B are plan views each for describing an operation in a magnetic field generation period.

In FIG. 6A, a first voltage Vs such as a ground voltage is supplied to the left end n1 of each of the drive electrodes TL(n−3) to TL(n−1), and a second voltage Vd having a larger absolute value than that of the first voltage Vs is supplied to the right end n2 thereof. Thus, in each of the drive electrodes TL(n−3) to TL(n−1), a current I1 in a direction heading from the right end n2 to the left end n1 of the drive electrode flows. As a result, the bundle drive electrode configured by the drive electrodes TL(n−3) to TL(n−1) generates a magnetic field ϕ11 in a direction indicated by a broken line in FIG. 6A. At this time, the second voltage Vd is supplied to the left end n1 of each of the drive electrodes TL(n+1) to TL(n+3), and the first voltage Vs is supplied to the right end 2 thereof. Thus, in each of the drive electrodes TL(n+1) to TL(n+3), a current I2 in a direction heading from the left end n1 to the right end n2 of the drive electrode flows. As a result, the bundle drive electrode configured by the drive electrodes TL(n+1) to TL(n+3) generates a magnetic field ϕ12 in a direction indicated by a broken line in FIG. 6A.

The directions of the magnetic fields ϕ11 and ϕ12 generated by the respective bundle drive electrodes are opposite to each other because the directions of the current I1 and the current I2 are opposite to each other, and are superimposed in the region of the drive electrode TL(n). Therefore, a strong magnetic field can be generated in the region of the drive electrode TL(n).

Figure 6B:
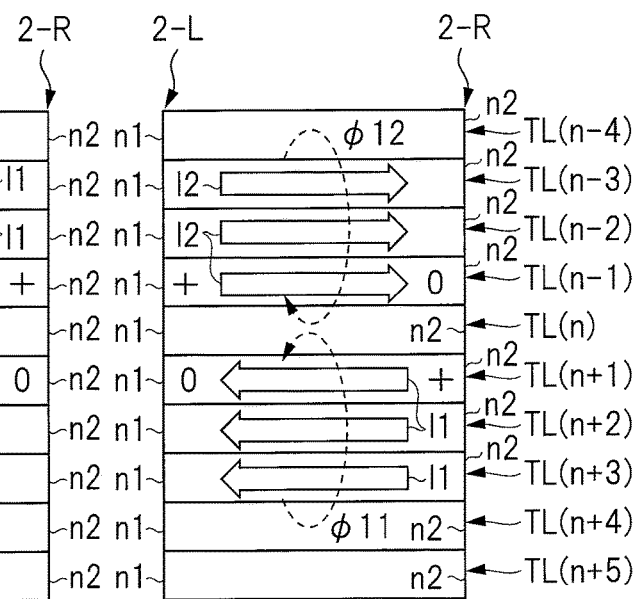

In FIG. 6B, a voltage supplied to a bundle drive electrode is made opposite to that in FIG. 6A. That is, a second voltage Vd is supplied to the left end n1 of each of drive electrodes TL(n−3) to TL(n−1), and a first voltage Vs is supplied to the right end n2 thereof. At this time, the first voltage Vs is supplied to left end n1 of each of drive electrodes TL(n+1) to TL(n+3), and the second voltage Vd is supplied to the other end n2 thereof. Thus, a direction of a current flowing through the drive electrodes TL(n−3) to TL(n−1) is opposite to that of the current in FIG. 6A, and becomes I2. Thus, a direction of a generated magnetic field is also opposite, so that a magnetic field ϕ12 in a direction indicated by a broken line is generated. Similarly, a direction of a current flowing through the drive electrodes TL(n+1) to TL(n+3) is opposite, and a direction of a magnetic field is opposite so as to be a magnetic field ϕ11 shown by a dot line. As a result, in the region of the drive electrode TL(n), the magnetic fields ϕ11 and ϕ12 are superimposed so that a strong magnetic field is generated.

Thus, even if the drive electrodes are not electrically connected to each other, the strong magnetic field can be generated in a desired drive electrode region. In FIG. 6, note that the first voltage Vs is indicated by "0", and the second voltage Vd is indicated by "+".

An electric charge is stored in the capacitive element in the pen P by the magnetic field generated in the magnetic field generation period, and the detection of the magnetic field generated by the pen P by using the magnetic-field detection coil in the magnetic-field detection period is similar to that in the above description with reference to FIG. 2.

<Configuration of Drive Electrode and Selecting Drive Circuits SDL and SDR>

As described in FIG. 6, during the magnetic field generation period, the drive circuits DRVL and DRVR shown in FIG. 4 are controlled by the selection circuits SELL and SELR so that the first voltage Vs and the second voltage Vd are alternately supplied to the ends n1 and n2 of the selected drive electrode. At this time, the control device 3 supplies the drive signal TPL having the first voltage Vs to the respective ends of the first lines TPLL and TPLR, and supplies the drive signal TSV having the second voltage Vd to the respective ends of the second lines TSVL and TSVR.

The drive circuit DRVL can be configured by a plurality of first switches connected between the respective left ends n1 of the drive electrodes and the first line TPLL and a plurality of second switches connected between the respective left ends n1 of the drive electrodes and the second line TSVL. In this case, the first switches or the second switches are turned on (electrically conducted) by the selection signal from the corresponding selection circuit SELL. Thus, the first voltage Vs or the second voltage Vd can be supplied to the left end n1 of the selected drive electrode. Similarly, the drive circuit DRVR can also be configured by a plurality of first switches connected between the respective right ends n2 of the drive electrodes and the first line TPLR and a plurality of second switches connected between the respective right ends n2 of the drive electrodes and the second line TSVR. By switching control for the plurality of first switches and the plurality of second switches which configure the drive circuit DRVR by the selection signal from the corresponding selection circuit SELR, the second voltage Vd or the first voltage Vs is supplied to the right end n2 of the selected drive electrode.

The present inventor has first considered that the drive electrodes TL(0) to TL(p) are formed into the same shape to have the same resistance value as one another. Also, the present inventor has considered that the first switch and the second switch are formed into the same size as each other. Thus, when viewed in a plan view, the drive electrodes having the same shape can be repeatedly (periodically) arranged in the display region 2 shown in FIG. 5. Since the first switch and the second switch have the same size, the drive circuits DRVL and DRVR can be configured by the repeat arrangement of the switches having the same shape.

Figure 7A:
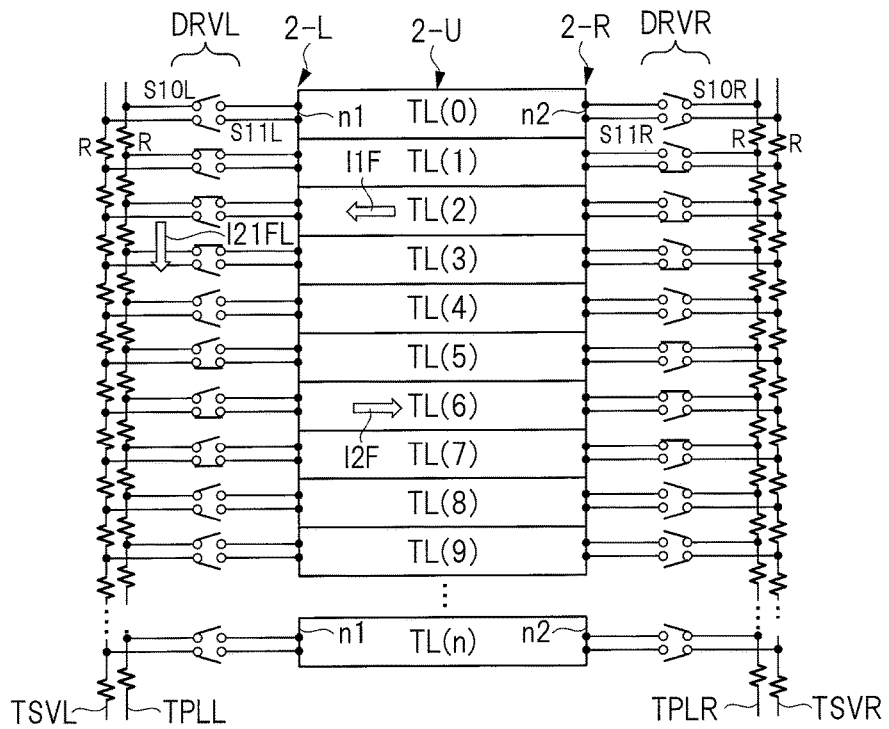
FIGS. 7A and 7B are plan views each showing configurations of a drive circuit and a drive electrode.
Figure 7B:
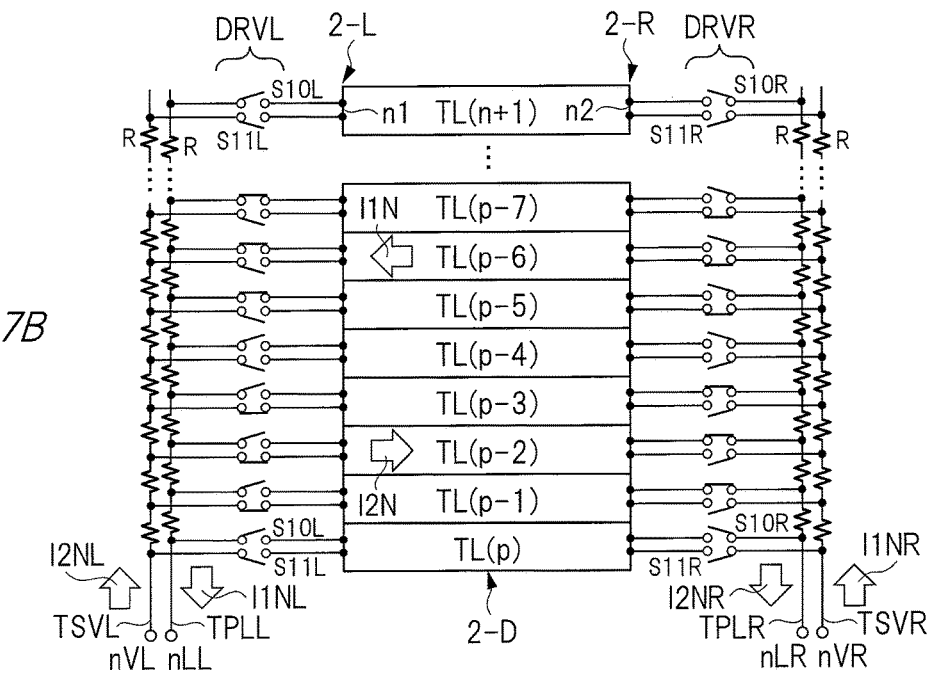

Each of FIGS. 7A and 7B is a plan view showing a configuration of the drive circuits DRVL and DRVR and the drive electrode. In order to avoid the complicated drawing, the plurality of drive electrodes TL(0) to TL(p) arranged in parallel to one another in the vertical direction are separately shown in FIGS. 7A and 7B between the side 2-U and the side 2-D in the display region 2. In the drawings, the drive electrodes TL(0) to TL(n) which are close to the side 2-U are shown in FIG. 7A, and the drive electrodes TL(n+1) to TL(p) which are close to the side 2-D are shown in FIG. 7B. When FIG. 7A is arranged above FIG. 7B, a plan view of the drive electrodes TL(0) to TL(p) is completed.

In FIGS. 7A and 7B, a switch connected between the first line TPLL and the left end n1 of each of the drive electrodes TL(0) to TL(p) corresponds to a first switch S10L configuring the drive circuit DRVL. And, a switch connected between the second line TSVL and the left end n1 of each of the drive electrodes TL(0) to TL(p) corresponds to a second switch S11L configuring the drive circuit DRVL. Similarly, in FIGS. 7A and 7B, a switch connected between the first line TPLR and the right end n2 of each of the drive electrodes TL(0) to TL(p) corresponds to a first switch S10R configuring the drive circuit DRVR. And, a switch connected between the second line TSVR and the right end n2 of each of the drive electrodes TL(0) to TL(p) corresponds to a second switch S11R configuring the drive circuit DRVR. In FIGS. 7A and 7B, note that reference characters S10L, S11L, S10R and S11R are attached to only some of the first switches and the second switches.

In FIG. 7B, reference characters nVL and nVR indicate ends of the second lines TSVL and TSVR, and reference characters nLL and nLR indicate ends of the first lines TPLL and TPLR. As shown in FIG. 5, the control device 3 and the flexible cable FB2 are arranged closer to the side 2-D of the display region 2, and the ends nLL, nLR, nVL, and nVR are connected to a circuit block arranged in the driving signal circuit 6 (see FIG. 4) or the flexible cable FB2 included in the control device 3. Thus, when viewed in a plan view, the drive electrodes TL(0) to TL(p) shown in FIGS. 7A and 7B are closer to the control device 3 and the flexible cable FB2 in an order from the drive electrodes TL(0) to TL(p). For example, the drive electrode TL(0) shown in FIG. 7A is arranged at a position which is the farthest from the control device 3 and the flexible cable FB2, and the drive electrode TL(p) shown in FIG. 7B is arranged at a position which is the closest to the control device 3 and the flexible cable FB2.

In the magnetic field generation period, the control device 3 supplies the driving signal TSV having the second voltage Vd to the respective ends nVL and nVR of the second lines TSVL and TSVR via the driving signal circuit 6, and supplies the driving signal TPL having the first voltage Vs to the respective ends nLL and nLR of the first lines TPLL and TPLR.

FIG. 7A shows a state of the first switches S10L and S10R and the second switches S11L and S11R obtained when the magnetic field is generated in a region of the drive electrode TL(4) which is closer to the side 2-U. On the other hand, FIG. 7B shows a state of the first switches S10L and S10R and the second switches S11L and S11R obtained when the magnetic field is generated in a region of the drive electrode TL(p−4) which is closer to the side 2-D.

In FIGS. 7A and 7B, with a resistance R attached on each of the lines TSVL, TSVR, TPLL, and TPLR, a resistance component caused in each line is indicated as a distributed-constant behaving resistance. In order to avoid the complicated drawing, note that a reference character R is attached to only some of resistances.

As shown in FIG. 7A, when the magnetic field is generated in the region of the drive electrode TL(4), the first switch S10L and the second switch S11R respectively connected to the ends n1 and n2 of each of the drive electrodes TL(1) to TL(3) are turned on, and the second switch S11L and the first switch S10R respectively connected to the ends n1 and n2 of each of the drive electrodes TL(5) to TL(7) are turned on. Thus, a current I1F in a direction as exemplified in the drive electrode TL(2) flows through the drive electrodes TL(1) to TL(3), and a current I2F in a direction as exemplified in the drive electrode TL(6), that is a direction opposite to the current I1F, flows through the drive electrodes TL(5) to TL(7). Therefore, the magnetic field is generated in the region of the drive electrode TL(4).

Similarly, as shown in FIG. 7B, when the magnetic field is generated in the region of the drive electrode TL(p−4), the first switch S10L and the second switch S11R respectively connected to the ends n1 and n2 of each of the drive electrodes TL(p−7) to TL(p−5) are turned on, and the second switch S11L and the first switch S10R respectively connected to the ends n1 and n2 of each of the drive electrodes TL(p−3) to TL(p−1) are turned on. Thus, a current I1N in a direction as exemplified in the drive electrode TL(p−6) flows through the drive electrodes TL(p−7) to TL(p−5), and a current I2N in a direction as exemplified in the drive electrode TL(p−2) flows through the drive electrodes TL(p−3) to TL(p−1). That is, the current I2N whose direction is opposite to that of the current I1N flows. Therefore, the magnetic field is generated in the region of the drive electrode TL(p−4).

When the magnetic field is generated in the region of the drive electrode TL(p−4), the drive electrodes TL(p−7) to TL(p−5) and TL(p−3) to TL(p−1) are connected to be close in a plan view to the ends nLL, nLR, nVL, and nVR of the lines TPLL, TPLR, TSVL, and TSVR to which the driving signal TPL or TSV is supplied. Therefore, the resistance R connected between each of the ends n1 and n2 of the drive electrodes and the end of the line is reduced. Thus, in the magnetic field generation period, a current having almost the same value as each of those of the currents I1NL, I1NR, I2NL, and I2NR respectively flowing through the ends nLL, nLR, nVL, and nVR flows through the drive electrodes as currents I1N and I2N. On the other hand, when the magnetic field is generated in the region of the drive electrode TL(4), the drive electrodes TL(1) to TL(3) and TL(5) to TL(7) are connected to be far in a plan view from the ends nLL, nLR, nVL, and nVR of the lines. Therefore, the resistance R connected between each of the ends n1 and n2 of the drive electrodes and the end of the line increases. Thus, in the magnetic field generation period, a current having a smaller value than each of those of the currents I1NL, I1NR, I2NL, and I2NR respectively flowing through the ends nLL, nLR, nVL, and nVR flows through these drive electrodes as currents I1F and I2F.

That is, a length of the line which supplies the driving signal also varies depending on a distance from the control device 3 including the driving signal circuit 6 and the flexible cable FB2 to the drive electrode. The longer the line from the driving signal circuit 6 to the drive electrode is, the larger the resistance R caused in the line is.

A current flowing through each of the drive electrodes TL(1) to TL(3) and TL(5) to TL(7) becomes smaller than a current flowing through each of the drive electrodes TL(p−7) to TL(P−5) and TL(p−3) to TL(p−1). Therefore, the magnetic field generated by each of the drive electrodes TL(1) to TL(3) and TL(5) to TL(7) becomes weaker than the magnetic field generated by each of the drive electrodes TL(p−7) to TL(p−5) and TL(p−3) to TL(p−1). As a result, the magnetic field generated in the region of the drive electrode TL(4) becomes weaker than the magnetic field generated in the region of the drive electrode TL(p−4). That is, the magnetic field generated by the drive electrode connected at a position which is far in a plan view from the ends nLL, nLR, nVL, and nVR connected to the driving signal circuit 6 becomes weaker than the magnetic field generated by the drive electrode connected at a position which is close to the ends nLL, nLR, nVL, and nVR. In other words, in a plan view, the magnetic field generated by the drive electrode arranged at a position which is far from the control device 3 where the driving signal circuit 6 is arranged and the flexible cable FB2 becomes weaker than the magnetic field generated by the drive electrode arranged at a position which is close thereto.

Figure 8:
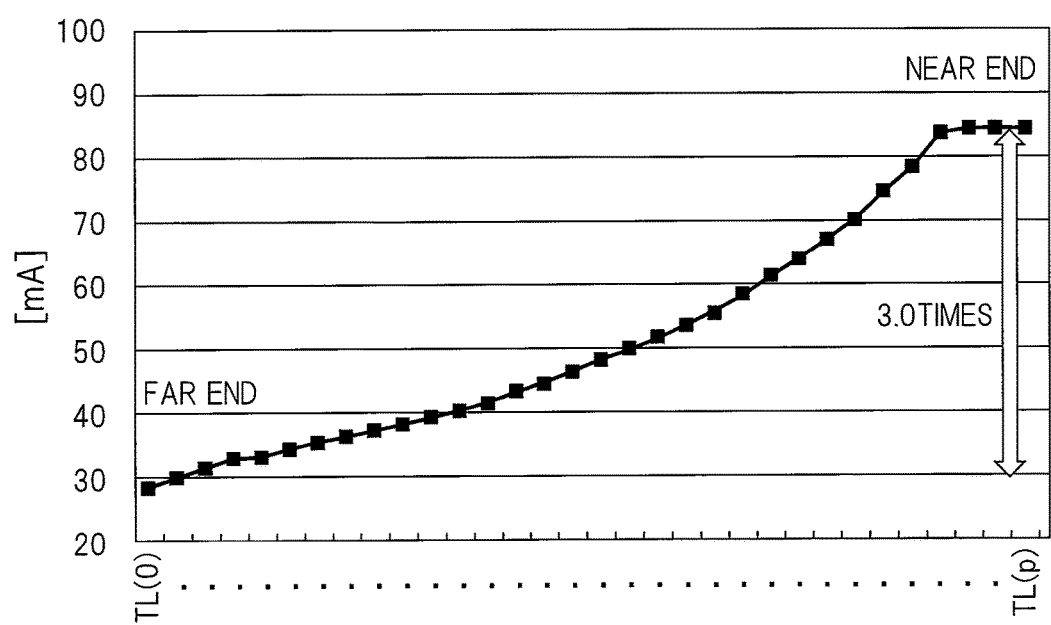
FIG. 8 is a property diagram showing a current flowing through the drive electrode in the magnetic field generation period.

FIG. 8 is a property diagram showing a value of the current flowing through the drive electrode in the magnetic field generation period. FIG. 8 is a property diagram created by the present inventor's measurement. In FIG. 8, a horizontal axis indicates a position of the drive electrode, and a "near end" indicates the drive electrode TL(p) arranged to be close to the ends nLL, nLR, nVL, and nVR to which the driving signal TPL or TSV is supplied, and a "far end" indicates the drive electrode TL(0) arranged to be far from the ends nLL, nLR, nVL, and nVR. The drive electrodes TL(p) to TL(0) are arranged to be farther from the ends of the lines in an order from the drive electrodes TL(p) to TL(0). A vertical axis in FIG. 8 indicates a value of the current flowing through the drive electrode. As understood from FIG. 8, in the magnetic field generation period, respective values of the currents flowing through the drive electrodes become smaller from the near end to the far end. In a result of the measurement by the present inventor, the value of the current flowing through the drive electrode at the near end is about three times the value of the current flowing through the drive electrode at the far end.

When the respective values of the currents flowing through the drive electrodes from the near end to the far end become smaller in this order, the respective magnetic fields generated by the drive electrodes from the near end to the far end also become weaker in this order. Thus, in the magnetic field generation period, an amount of electric charge stored in the capacitive element in the pen P varies depending on the touched position. As a result, in the magnetic-field detection period, an amount of the change detected by the magnetic-field detection coil also varies. Therefore, the detection sensitivity varies depending on the position. For example, it is expected that the variation in the detection sensitivity can be reduced and be constant to the position by adjustment of the received detection signals Rx(0) to Rx(p) in the touch control device 5 shown in FIG. 4. However, as shown in FIG. 8, when the currents respectively flowing through the drive electrodes are different from one another by three times, the variation in the generated magnetic field is large. Therefore, such adjustment as causing the constant detection sensitivity is not so easy.

Figure 9A:
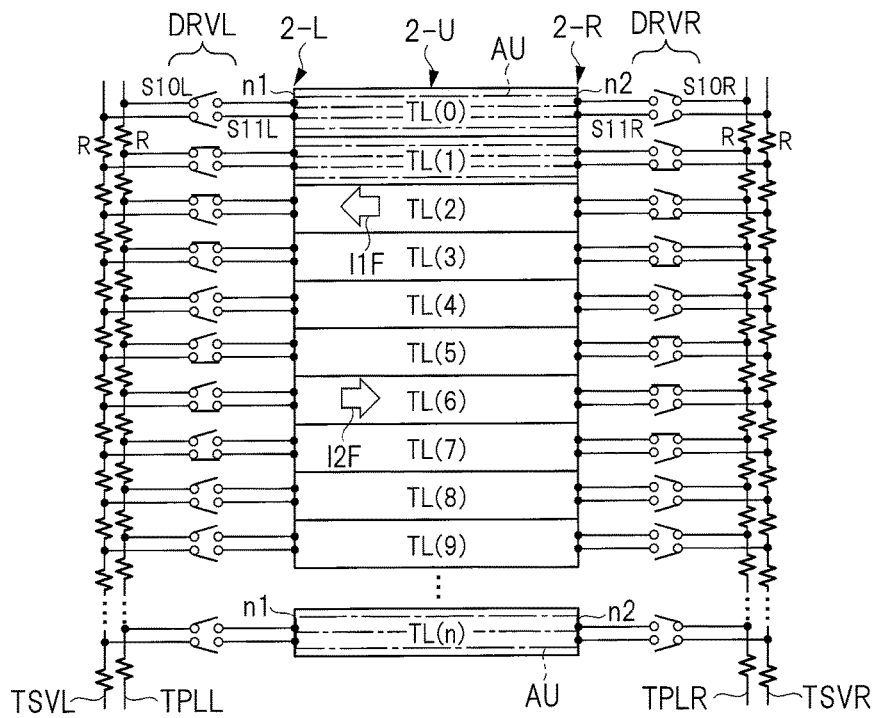
FIGS. 9A and 9B are plan views each showing configurations of a drive circuit and a drive electrode according to the first embodiment.
Figure 9B:
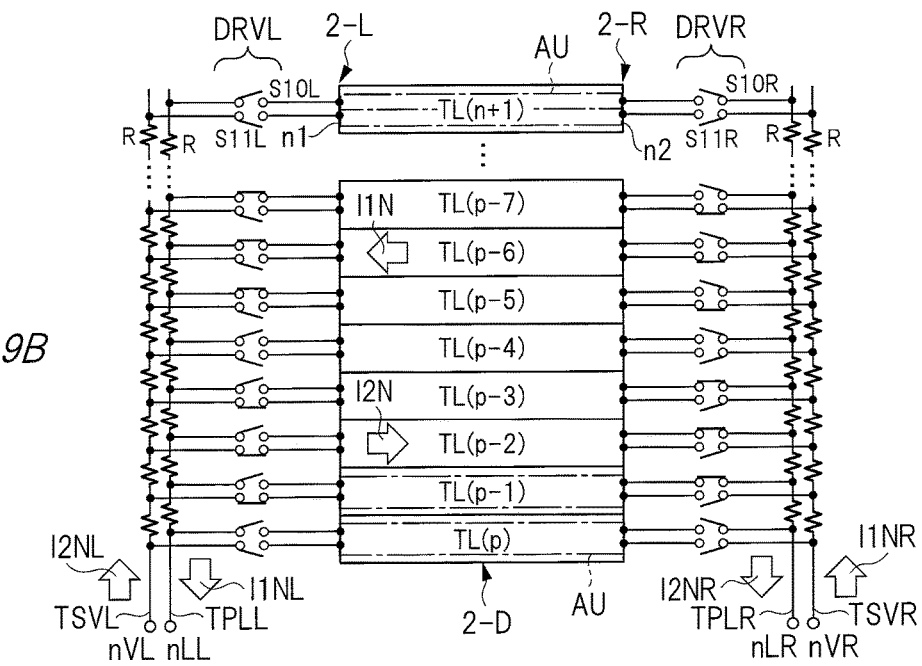

FIGS. 9A and 9B are plan views each showing a configuration of the drive circuits DRVL and DRVR and the drive electrodes according to the first embodiment. In order to avoid the complicated drawing, FIG. 9A shows the drive electrodes TL(0) to TL(n) arranged to be far in a plan view from respective ends nLL, nLR, nVL, and nVR of the lines TPLL, TPLR, TSVL, and TSVR to which a driving signal TPL or TSV is supplied and shows the corresponding drive circuits as similar to FIGS. 7A and 7B. FIG. 9B shows the drive electrodes TL(n+1) to TL(p) arranged to be close in a plan view to the respective ends nLL, nLR, nVL, and nVR of the lines TPLL, TPLR, TSVL, and TSVR and shows the corresponding drive circuits. When FIG. 9A is arranged above FIG. 9B, a plan view of the drive electrodes TL(0) to TL(p) arranged in parallel to one another in the vertical direction between the side 2-U and the side 2-D of the display region 2 and the drive circuits DRVL and DRVR corresponding thereto is completed. Note that the completed plan view is drawn to match a practical arrangement.

As similar to FIG. 7A, FIG. 9A shows a state in which the first switch S10L and the second switch S11R connected to the drive electrodes TL(1) to TL(3) are turned on and the second switch S11L and the first switch S10R connected to the drive electrodes TL(5) to TL(7) are turned on so that the magnetic field is generated in the region of the drive electrode TL(4). And, as similar to FIG. 7B, FIG. 9B shows a state in which the first switch S10L and the second switch S11R connected to the drive electrodes TL(p−7) to TL(p−5) are turned on and the second switch S11L and the first switch S10R connected to the drive electrodes TL(p−3) to TL(p−1) are turned on so that the magnetic field is generated in the region of the drive electrode TL(p−4).

As different from FIGS. 7A and 7B, in the first embodiment, conductive line patterns AU having a predetermined pattern form oppose each of the drive electrodes TL(0) to TL(p) to overlap (be superimposed on) the drive electrodes in a plan view, and are electrically connected, for example, ohmic-connected In FIGS. 9A and 9B, the line pattern AU is shown by a one dot and dash line, and extends in the horizontal direction (row direction) and are arranged in parallel to one another in the vertical direction (column direction) as similar to the drive electrodes TL(0) to TL(p). FIGS. 9A and 9B show only the line patterns AU connected to each of the drive electrodes TL(0), TL(1), TL(n), TL(n+1), TL(p−1), and TL(p). However, a plurality of line patterns AU are connected to each of the drive electrodes TL(0) to TL(p), and the respective numbers of the line patterns AU connected to the drive electrodes decrease in an order from the drive electrode TL(0) to the drive electrode TL(p).

When the explanation is made by using the line patterns AU shown in FIGS. 9A and 9B, the number of the line patterns AU connected to the drive electrode TL(0) arranged closer to the side 2-U of the display region 2 is the largest, and the number of the line patterns AU connected to the drive electrode TL(p) arranged closer to the side 2-D is the smallest. The number of the line patterns AU connected to the drive electrode (e.g., TL(n)) arranged at the midpoint between the side 2-U and the side 2-D is between the number of the line patterns AU connected to the drive electrode TL(0) and the number of the line patterns AU connected to the drive electrode TL(P).

That is, the respective numbers of the line patterns AU connected to the drive electrodes decrease in an order from the drive electrode TL(0) connected at a position which is far from the ends nLL, nLR, nVL, and nVR to the drive electrode TL(p) connected at a position which is close to the ends nLL, nLR, nVL, and nVR.

The line pattern AU is conductive, and functions as an auxiliary electrode for reducing a combined resistance of a drive electrode by being connected to the drive electrode. Therefore, even if the drive electrodes TL(0) to TL(p) have the same resistance value as one another, the respective numbers of the connected line patterns AU decrease in an order from the drive electrode TL(0) to the drive electrode TL(p), so that the respective values of the combined resistances increase in an order from the drive electrode TL(0) to the drive electrode TL(p). That is, the respective combined resistances of the drive electrodes increase in an order from the drive electrode TL(0) connected which is far from the ends nLL, nLR, nVL, and nVR to the drive electrode TL(p) connected which is close to the ends nLL, nLR, nVL, and nVR in a plan view.

As described above, resistances "R" of the lines TPLL, TPLR, TSVL, and TSVR increase in order from a position which is closer to the ends nLL, nLR, nVL, and nVR to a position which is far therefrom. However, the respective combined resistances of the drive electrodes increase in an order from the position which is far from the ends nLL, nLR, nVL, and nVR to the position which is close thereto. As a result, it is possible to reduce a difference between a total combined resistance in a current path formed when a magnetic field is generated in the drive electrode (e.g., nVL(nLL)~TL(p)~nVR(nLR)) and a total combined resistance in a current path formed when a magnetic field is generated in the drive electrode (e.g., nVL(nLL)~TL(0)~nVR(nLR)). Thus, in the magnetic field generation period, it is possible to reduce a difference between a current flowing through the drive electrode TL(p) connected to be close to the side 2-D and a current flowing through the drive electrode TL(0) connected to be far from the side 2-D, so that the strength of the generated magnetic fields can be made the same or nearly the same as each other.

A magnetic field having a strength which does not depend on the position in a plan view from each of the ends nLL, nLR, nVL, and nVR can be generated. Therefore, the variation in the detection sensitivity depending on the position can be reduced. The drive electrodes TL(0) to TL(p) have the same planar shape as one another. As described above with reference to FIG. 6, in the magnetic field touch detection, the strong magnetic field is generated in the region of the drive electrode sandwiched between the drive electrodes which generate the magnetic fields in a plan view. By the same planar shape of the drive electrodes, it is possible to prevent such a variation in a coverage of the region where the strong magnetic field is generated as depending on the positon in the display region 2, so that it is possible to prevent such a variation in a resolution in the magnetic field touch detection as depending on the position.

<Detailed Configuration of Drive Electrode and Selecting Drive Circuits SDL and SDR>

Figure 10:
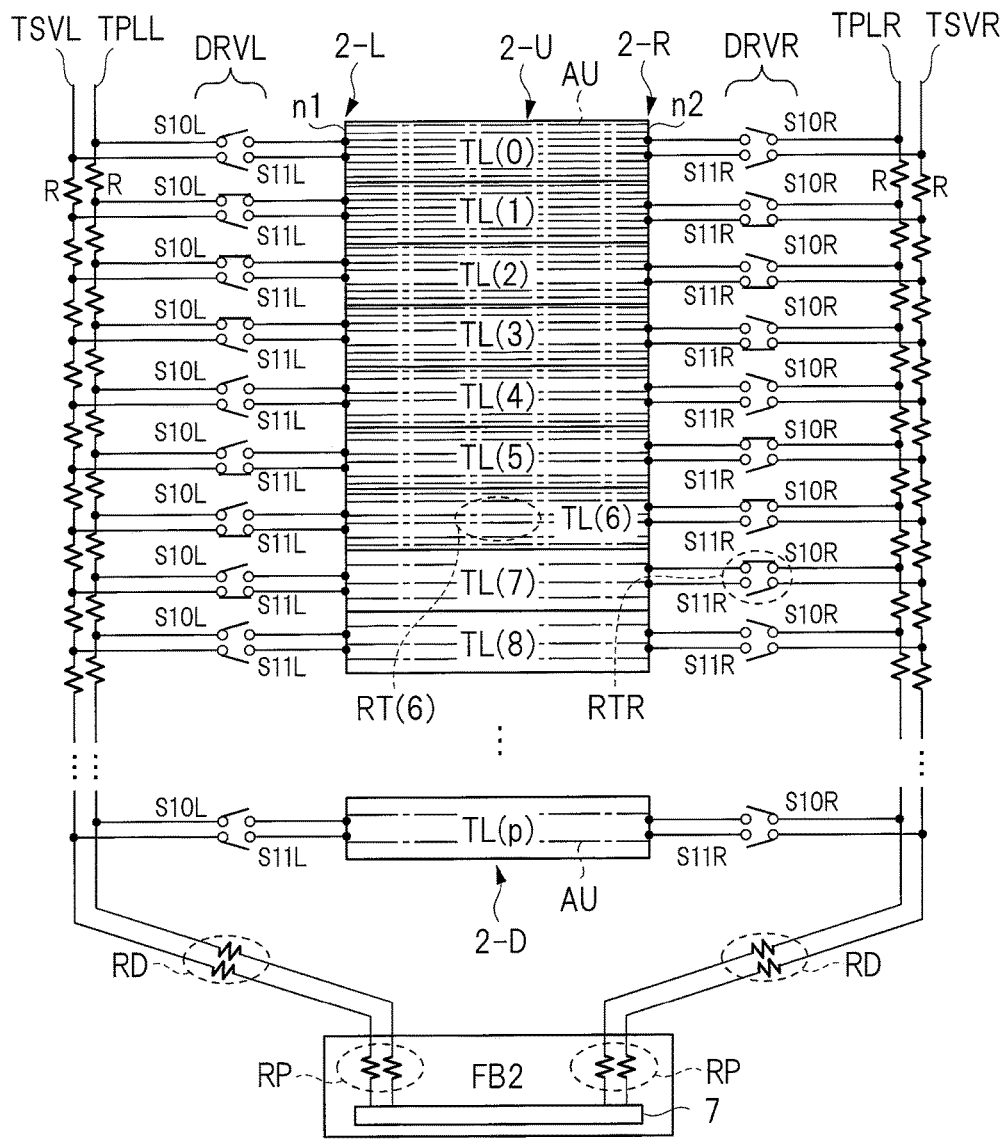
FIG. 10 is a plan view showing a configuration of the drive circuit and the drive electrode according to the first embodiment.

FIG. 10 is a plan view showing a configuration of drive electrodes and drive circuits according to the first embodiment. FIG. 10 is a plan view in which the drive electrodes TL(9) to TL(p-1) are omitted from the drive electrodes TL(0) to TL(p) shown in FIGS. 9A and 9B. The drive circuits respectively corresponding to the omitted drive electrodes are also omitted in FIG. 10. While the drive electrodes and the corresponding drive circuits are omitted, the drive electrodes, lines, and others shown in the drawing match the practical arrangement.

Each of FIGS. 9A and 9B shows the respective ends nLL, nLR, nVL, and nVR as the ends of the lines TPLL, TPLR, TSVL, and TSVR. However, in FIG. 10, an output of another circuit block 7 provided in the flexible cable FB2 (see FIG. 5) is connected to the ends of the lines TPLL, TPLR, TSVL, and TSVR. When another circuit block 7 forms the driving signals TPL and TSV as described in FIG. 5, some of the lines are covered by the control device 3 when viewed in a plan view although not particularly limited. Here, a case of usage of a power supply circuit which forms a first voltage Vs and a second voltage Vd as another circuit block 7 will be described.

Also in FIG. 10, each of the line patterns AU ohmic-connected to the drive electrode is also indicated by a one dot and dash line. In order to avoid the complicated drawing a reference character AU is attached to only one of the plurality of line patterns connected to the drive electrodes TL(0) and TL(p) also in FIG. 10.

In FIG. 10, eight line patterns AU are connected to each of the drive electrodes TL(0) and TL(1) so as to be in parallel to one another, seven line patterns AU are connected to each of the drive electrodes TL(2) and TL(3) so as to be in parallel to one another, and six line patterns AU are connected to each of the drive electrodes TL(4) to TL(6) so as to be in parallel to one another, although not particularly limited. Three line patterns AU are connected to each of the drive electrodes TL(7) to TL(8) so as to be in parallel to one another, and two line patterns AU are connected to the drive electrodes TL(p). Of course, the number of line patterns AU connected to each of the drive electrodes is not limited to this. The respective numbers of line patterns connected to the drive electrodes may decrease in an order from the side 2-U to the side 2-D of the display region 2. As shown in FIG. 10, the same number of line patterns AU may be connected to the adjacent drive electrodes. Further, the line patterns AU may not be connected to the drive electrode which is the closest to the side 2-D.

In FIG. 10, first switches S10L and S10R and second switches S11L and S11R connected to each of the drive electrodes TL(0) to TL(8) are in the same state as that shown in FIG. 9A. Although not described in detail, the state is the drive state shown in FIG. 6 so as to, in the drive electrode TL(4), superimpose a magnetic field generated by a bundle drive electrode formed by the drive electrodes TL(1) to TL(3) with a magnetic field generated by a bundle drive electrode formed by the drive electrodes TL(5) to TL(7) to generate the strong magnetic field.

Since the plurality of line patterns AU are ohmic-connected to each of the drive electrodes TL(0) to TL(8) and TL(p), the drive electrode and the line patterns AU are connected in parallel to each other. Thus, a value of a combined resistance of the drive electrode is obtained from a combination of a resistance of the drive electrode and a resistance of the line patterns AU. In FIG. 10, a combined resistance of the drive electrode TL(6) is indicated as a reference character RT(6). In FIG. 10, a reference character RTR indicates an on-resistance obtained when the first switch or the second switch is turned on.

Also in FIG. 10, a reference character R indicates a resistance of each of the lines TPLL, TPLR, TSVL, and TSVR expressed as a distributed-constant behaving resistance component as similar to FIGS. 9A and 9B. In FIG. 10, a reference character RD indicates a resistance of a pull-out portion of each of the lines TPLL, TPLR, TSVL, and TSVR, and a reference character RP indicates a mounting resistance and a power supply impedance. As shown in FIG. 4, each of the lines TPLL, TPLR, TSVL and TSVR includes a vertically extending portion in a region between the sides 2-L and 2-R of the display region 2 and the long sides 500-L and 500-R of the module 500 and includes a pull-out portion connecting the vertically extending portion and an end of the flexible cable FB2. In FIG. 10, a resistance of the pull-out portion is indicated as a reference character RD. And, in FIG. 10, a mounting resistance including a resistance or others caused in mounting the flexible cable FB2 on the region 501 (FIG. 5) and a resistance including a power supply impedance of a power supply circuit are indicated as a resistance RP.

<Content of Combined Resistance in Magnetic Field Generation Period>

FIG. 11 is a diagram showing contents of a combined resistance of a current path formed by a selected drive electrode in the magnetic field touch detection. In this drawing, contents of respective combined resistances of a current path formed at a far end and a current path formed at a near end are shown. Here, as the current path formed at the far end, the drawing shows a current path formed by a selected drive electrode (e.g., TL(0)) arranged to be far from the flexible cable FB2 in a plan view. And, as the current path formed at the near end, the drawing shows a current path formed by a selected drive electrode (e.g., TL(p)) arranged to be close to the flexible cable FB2.

As the current path formed at the near end, FIG. 11 shows two types of current paths at a near end and an adjusted near end. FIG. 11 shows a case in which the line patterns AU are connected at the adjusted near end and the far end so that the respective numbers of line patterns AU decrease in an order from the drive electrode which is far from the flexible cable FB2 (or the end of the line) to the drive electrode which is close thereto as shown in FIGS. 9A, 9B and 10. On the other hand, FIG. 11 shows a case in which the same number of line patterns AU as that at the far end are connected at the near end.

In FIG. 11, the contents of the resistance component are indicated by a length of a bar in assuming that the combined resistance of the current path formed at the far end is "1". In the bar shown in FIG. 11, a portion filled with positive slope lines indicates a combined value of the resistance R, a portion filled with negatively sloped lines indicates a combined resistance (a TL resistance in FIG. 11) of the drive electrode. In the bar, a portion filled with dots indicates an on-resistance RTR (a switch on-resistance in FIG. 11) of the first switch or the second switch, a portion filled with rhombi indicates a resistance RD of the pull-out portion, and a portion filled with horizontal lines indicates a resistance RP of a mounting resistance and a power supply impedance.

As shown in FIG. 11, the far end, the near end, and the adjusted near end are almost the same as one another in occupation ratios of the on-resistance (switch on-resistance) of the first switch or the second switch, the resistance RD (the portion filled with rhombi) of the pull-out portion, and the resistance RP (the portion filled with horizontal lines) of the mounting resistance/power supply impedance. On the other hand, the resistance R of the line changes in accordance with the position of the line to which the selected drive electrode is connected, and is larger at the far end than the near end and the adjusted near end.

Thus, when the resistance (TL resistance) of the drive electrode is the same between the far end and the near end as shown in FIG. 11, the combined resistance of the current path formed at the near end becomes smaller than the combined resistance of the current path formed at the far end. As a result, in the magnetic field generation period, a current flowing through the current path formed at the near end increases, and the strength of the magnetic field generated depending on the position changes. On the other hand, the adjusted near end is smaller than the far end in the number of line patterns connected to the drive electrode arranged at the near end. Therefore, as shown in the adjusted near end, the combined resistance (TL resistance) of the drive electrode arranged at the near end can be increased. As a result, in the magnetic field generation period, the change in the strength of the magnetic field generated depending on the position can be prevented, so that position dependency of the detection sensitivity can be reduced.

<Electric Field Touch Detection>

The display apparatus 1 according to the first embodiment can also achieve the electric field touch detection. During a period of the electric field touch detection (hereinafter also referred to as electric field touch detection period), the control device 3 shown in FIG. 4 outputs a first voltage Vs as a driving signal TPL, and outputs a signal whose voltage periodically changes as a driving signal TSV. Although not particularly limited, the voltage of the driving signal TSV periodically changes between the first voltage Vs and the second voltage Vd in the electric field touch detection. When not the control device 3 but the power supply circuit is used as a driving signal circuit which forms the driving signals TPL and TSV, note that the power supply circuit outputs the driving signal TPL having the first voltage Vs and the driving signal TSV whose voltage periodically changes in the electric field touch detection.

Each of the selection circuits S11L and SELR shown in FIG. 4 outputs a selection signal for selecting a desired one drive electrode of the drive electrodes TL(0) to TL(p) in the electric field touch detection. That is, while six drive electrodes configuring a pair of bundle drive electrodes are selected in the magnetic field touch detection, the smaller number of the drive electrodes than that in the magnetic field touch detection is selected in the electric field touch detection. The drive circuit DRVL connects the left end n1 of the one drive electrode designated by the selection signal to the second line TSVL, and the drive circuit DRVR also connects the right end n2 of the one drive electrode designated by the selection signal to the second line TSVR.

For example, in FIGS. 9A and 10, each of the selection circuits S11L and SELR outputs a selection signal for selecting the drive electrode TL(4) in the electric field touch detection. By the selection signal, the second switch S11L connected between the left end n1 of the drive electrode TL(4) and the second line TSVL is turned on. At this time, the second switch S11R connected between the right end n2 of the drive electrode TL(4) and the second line TSVR is turned on. Thus, the driving signal TSV is transmitted through the second lines TSVL and TSVR and is supplied to both the ends n1 and n2 of the selected drive electrode TL(4). As a result, a voltage of the selected drive electrode TL(4) changes in accordance with the change in the voltage of the driving signal TSV, and generates an electric field which changes in accordance with the change in the driving signal TSV. It is detected whether or not the finger is touching the position which is close to the region of the selected drive electrode TL(4) as described with reference to FIG. 3.

In the first embodiment, the strong magnetic field is generated in a region of the one drive electrode sandwiched between the bundle drive electrodes in a plan view in the magnetic field touch detection. That is, a region where the strong magnetic field is generated in the magnetic field touch detection and a region where the electric field is generated in the electric field touch detection become a region of the same one drive electrode. Thus, respective detection resolutions in the magnetic field touch detection and in the electric field touch detection can be made to match each other.

Although not particularly limited, note that the first switch S10L connected between the left end n1 of the drive electrode and the first line TPL and the first switch S10R connected between the right end n2 of the drive electrode and the first line TPR are turned on for the drive electrode which is not selected, i.e., the non-selected drive electrode in the electric field touch detection. Thus, both the ends n1 and n2 of the non-selected drive electrode are connected to the first lines TPLL and TPLR via the first switches S10L and S10R, respectively. Since the driving signal TPL having the first voltage Vs is supplied to the first lines TPLL and TPLR in the electric field touch detection period, change in the voltage of the non-selected drive electrode can be prevented, so that noises can be reduced. At this time, a direct-current voltage different from the first voltage Vs may be supplied to the driving signal TPL. The direct-current voltage may have any value, and may be a common electrode voltage in a display period.

<Contents of Combined Resistance in Magnetic Field Touch Detection and Electric Field Touch Detection>

As shown in FIGS. 9 and 10, in the magnetic field touch detection, one bundle drive electrode is formed by three adjacent drive electrodes. When the plurality of drive electrodes are bundled as described above, a combined resistance of a current path is reduced so that a flowing current can be increased. On the other hand, in the electric field touch detection, a path including one drive electrode is formed, and a driving signal (electric-field driving signal) TSV is supplied to the path. That is, while three current paths are formed in parallel to one another in the magnetic field touch detection, only one path is formed in the electric field touch detection.

Figure 12:
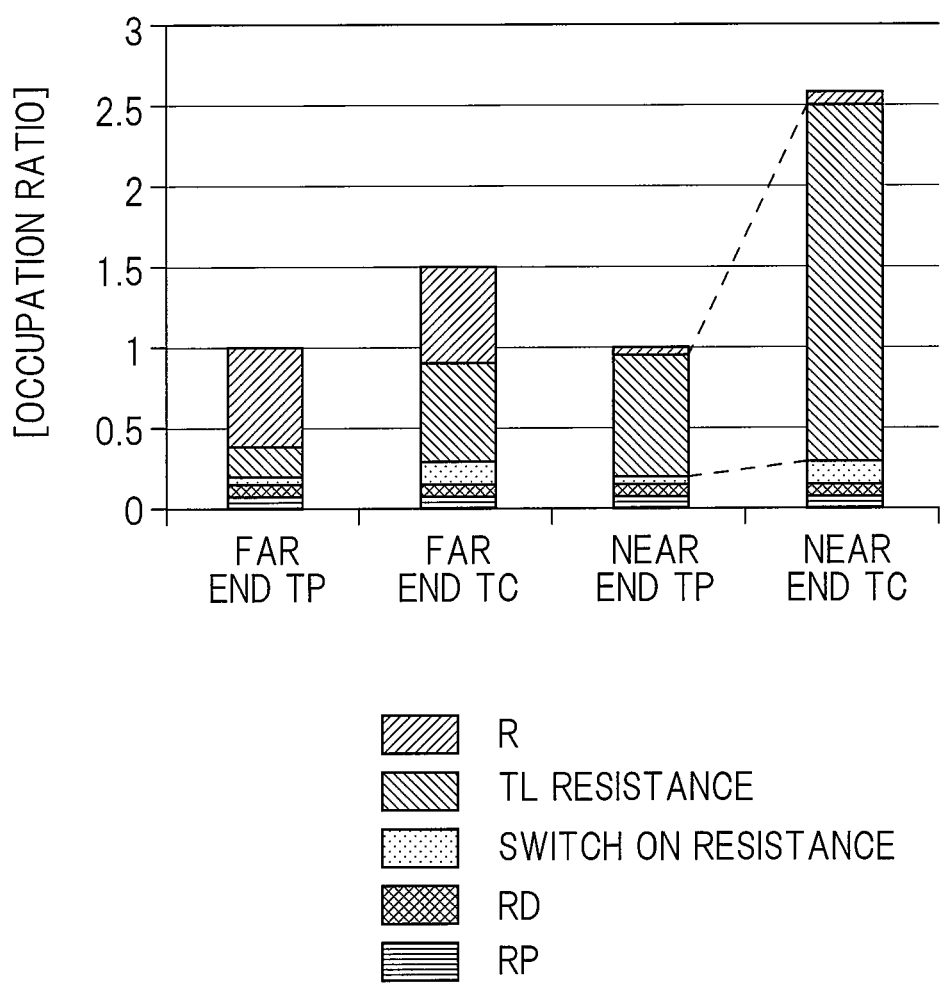
FIG. 12 is a diagram showing contents of a combined resistance of a path according to the first embodiment.

FIG. 12 is a diagram showing contents of a combined resistance of a current path formed in the magnetic field generation period for the magnetic field touch detection and contents of a combined resistance of a path formed in the electric field touch detection. FIG. 12 shows the contents of the combined resistance depending on the length of the bar as similar to FIG. 11. Also in FIG. 12, a vertical axis indicates an occupation ratio of each of the resistance components. In FIG. 12, a far end TP shown on a horizontal axis indicates a current path formed at a far end in the magnetic field generation period, and a near end TP thereon indicates a current path formed at a near end in the magnetic field generation period.

On the horizontal axis shown in FIG. 12, a far end TC indicates a path including a drive electrode connected at a position which is far from an end of the flexible cable FB2 (or an end of the second line) in the electric field touch detection. In FIG. 12, a near end TC indicates a path including a drive electrode connected at a position which is close to the end of the flexible cable FB2 (or the end of the second line) in the electric field touch detection.

The far end TC indicates a path including, for example, the drive electrode TL(0) shown in FIG. 10. The path in this case includes a path in which the second line TSVL, the second switch S11L, the drive electrode TL(0), the second switch S11R, and the second line TSVR shown in FIG. 10 are connected in series. The near end TC indicates a path including, for example, the drive electrode TL(p) shown in FIG. 10. The path in this case includes a path in which the second line TSVL, the second switch S11L, the drive electrode TL(p), the second switch S11R, and the second line TSVR shown in FIG. 10 are connected in series.

Since the far end TP shown in FIG. 11 is the same as the far end shown in FIG. 11 and the near end TP shown in FIG. 12 is the same as the adjusted near end shown in FIG. 11, description thereof is omitted. FIG. 12 also shows respective combined resistances at the far end TC, the near end TP, and the near end TC in assuming that a reference value is "1". In a bar shown in FIG. 12, a resistance R, a TL resistance, a switch on-resistance, a resistance RD, and a resistance RP are shown with the same notation method as that shown in FIG. 11.

When the far end TP and the far end TC are compared with each other in FIG. 12, the combined resistance at the far end TC is larger than that at the far end TP because the respective occupation ratios of the TL resistance and the switch on-resistance are large at the far end TC. In the magnetic field generation period, while the bundle of the plurality of drive electrodes is connected to the line at the far end TP, one drive electrode is connected to a line at the far end TC. Therefore, a difference as shown in FIG. 12 occurs. From a similar reason, also when the near end TP and the near end TC are compared with each other, the combined resistance at the near end TC is larger than that at the near end TP because the respective occupation ratios of the TL resistance and the switch on-resistance are also large at the near end TC.

When the far end TC and the near end TC are compared with each other, the occupation ratio of the TL resistance is large because the respective numbers of the line patterns AU connected to the drive electrodes decrease in an order from the position which is far from the flexible cable FB2 to the position which is close thereto as described above, so that the combined resistance at the near end TC is higher than the combined resistance at the far end TC. Since the drive electrodes are not bundled in the electric field touch detection, the TL resistance has a resistance value which is nearly three times a resistance value at the far end TP.

That is, in the electric field touch detection, a combined resistance (at the near end TC) of a path formed to be close to the flexible cable FB2 becomes larger than a combined resistance (at the far end TC) of a path formed to be far therefrom. However, in the electric field touch detection, a current does not flow through a formed path in principle, and the change in the voltage of the selected drive electrode is important. That is, it is important to make a time constant stable without depending on the position from the flexible cable FB2, the time constant indicating the change in the voltage of the selected drive electrode.

<Time Constant in Electric Field Touch Detection>

Figure 13:
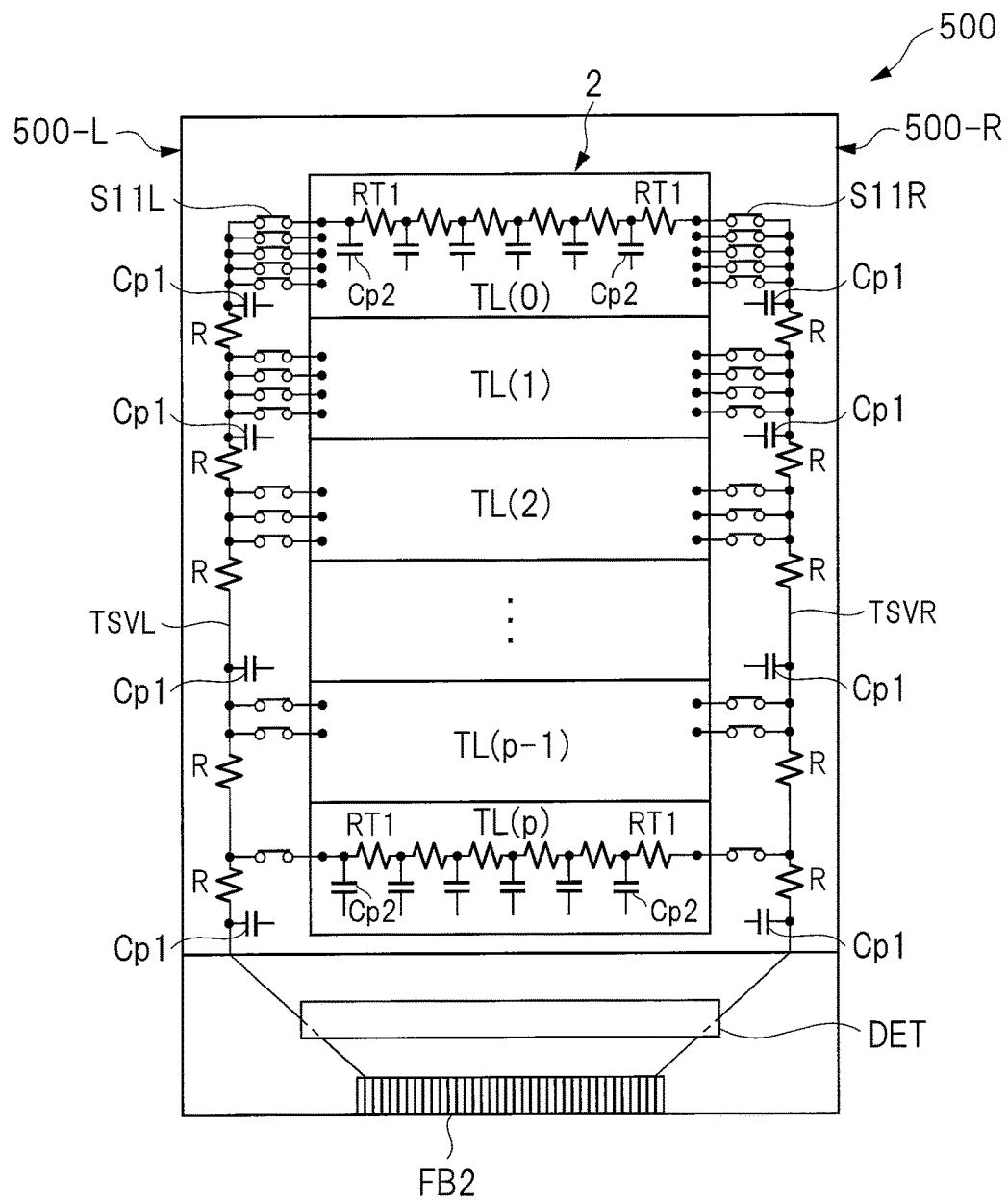
FIG. 13 is a plan view showing a configuration of a module according to the first embodiment.

FIG. 13 is a plan view showing the module 500 shown in FIG. 5 to be more simplified. In FIG. 13, reference characters TL(0) to TL(p) indicate drive electrodes arranged in the display region 2. FIG. 13 shows a state in the electric field touch detection period.

In FIG. 13, only the second switches arranged on the uppermost side are denoted with reference characters S11L and S11R, and respective reference characters of other second switches are omitted. FIG. 13 shows the number of the line patterns AU as the number of the second switches S11L or S11R connected in parallel between the one drive electrode and the second line TSVL or TSVR. That is, the larger the number of the connected switches is, the larger the number of the connected line patterns AU is. In FIG. 13, a reference character R is a distributed-constant behaving resistance of the resistances of the lines TSVL and TSVR, and a reference character Cp1 is a distributed-constant behaving capacitance of the capacitances of the lines TSVL and TSVR.

A reference character RT1 is a distributed-constant behaving resistance of the resistances of the drive electrodes TL(0) to TL(p) to which the line patterns AU are connected, and a reference character Cp2 is a distributed-constant behaving capacitance of the capacitances of the drive electrodes TL(0) to TL(p) to which the line patterns AU are connected. Note that FIG. 13 shows all the second switches connected to the drive electrodes TL(0) to TL(2) and TL(p−1) to TL(p) to be turned on. However, in the electric field touch detection period, one drive electrode is connected to the lines TSVL and TSVR to generate the electric field.

The line patterns AU extend in the same direction as that of the drive electrode, and are connected to the drive electrode. Thus, the line pattern AU can also be indicated by distributed-constant capacitance and resistance. A resistance RT1 and a capacitance Cp2 shown in FIG. 13 are respective combinations of resistances and capacitances of the drive electrode and the line patterns AU connected to the drive electrode. That is, the distributed-constant behaving resistance RT1 changes in accordance with the number of the connected line patterns AU, and a resistance value behaves as a distributed constant. The near end TC has the small number of the connected line patterns AU, and therefore, is larger than the far end TC in the resistance RT1 (about four times in the example shown in FIG. 12). However, the resistance RT1 behaves as a distributed constant for the capacitance Cp2, and therefore, influence on the time constant becomes roughly ½ of an original value. Thus, a difference between the resistance RT1 at the far end TC and the resistance RT1 at the near end TC does not appear as it is as a difference (a time constant difference) between a time constant at the far end TC and a time constant at the near end TC. Further, the near end TC is a path formed to be closer to the flexible cable FB2 than the far end TC, and therefore, has an originally small resistance R of the line. Thus, the time constant at the near end TC and the time constant at the far end TC can be made almost the same as each other.

Figure 14:
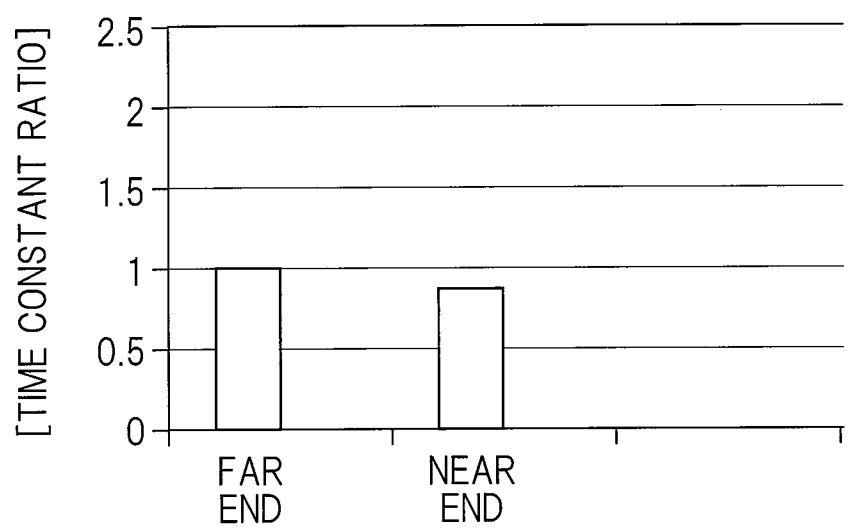
FIG. 14 is a property diagram showing a time constant property according to the first embodiment.

FIG. 14 is a property diagram showing a time constant in a drive electrode in the electric field touch detection period. In FIG. 14, a far end shown on a horizontal axis indicates a drive electrode (e.g., TL(0)) arranged at a position which is far from the flexible cable FB2, and a near end shown on the horizontal axis indicates a drive electrode (e.g., TL(p)) arranged at a position which is close to the flexible cable FB2. A vertical axis indicates a time constant ratio. In FIG. 14, in the electric field touch detection period, the time constant ratio on the vertical axis is defined in assuming that a time constant in supply of the driving signal TSV to the drive electrode at the far end is a reference "1". As shown in FIG. 14, a time constant in supply of the driving signal TSV to the drive electrode arranged at the near end is a value close to the reference "1", and therefore, hardly degrades at the near end. That is, degradation of the performance of the electric field touch detection can be suppressed even if the respective numbers of the line patterns AU connected to the drive electrodes decrease in an order from the drive electrode arranged at the position which is far from the flexible cable FB2 (or the end of the line) to the drive electrode arranged at the position which is close thereto as shown in FIGS. 9A, 9B and 10.

<Configuration of Line Pattern>

Figure 15:
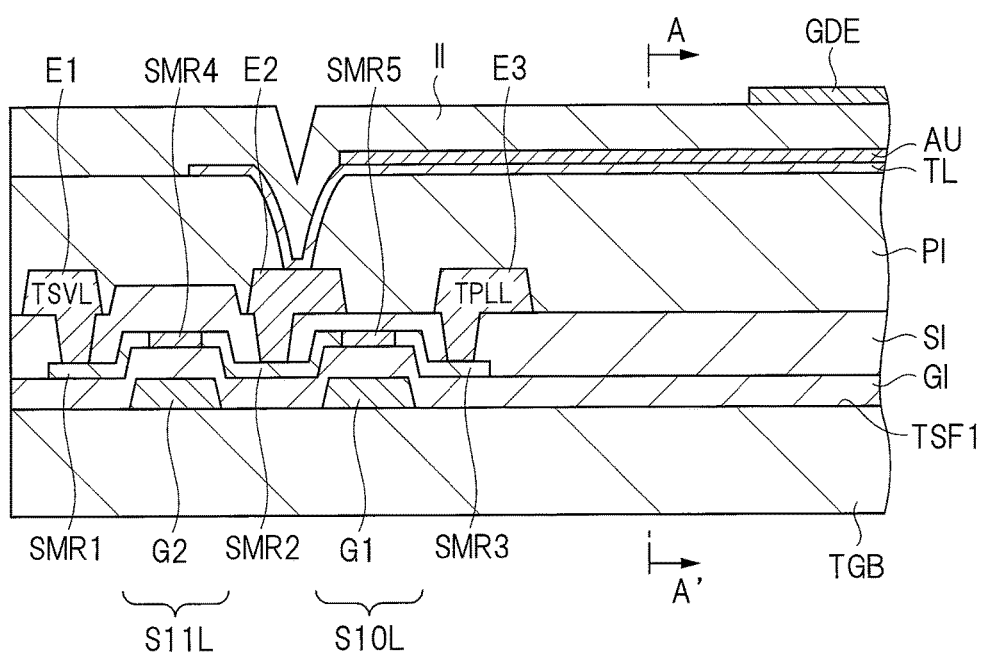
FIG. 15 is a cross-sectional view showing a cross section of the display apparatus according to the first embodiment.

FIG. 15 is a cross-sectional view showing a cross section of the display apparatus 1 according to the first embodiment. Here, explanation will be made in a case of usage of a field effect transistor (hereinafter also referred to as a transistor) as the first switches S10L and S10R and the second switches S11L and S11R described above as an example. In this drawing, a right region shown on an arrow A-A' indicates the display region 2, and a left region shown on the arrow A-A' indicates a peripheral region surrounding the display region 2. While FIG. 15 shows a portion closer to the side 2-L of the display region 2 as an example, a portion closer to the side 2-R of the display region 2 also has a similar but left-right reversal configuration.

In FIG. 15, a reference character TGB indicates the first substrate described with reference to FIG. 1B and others. In the peripheral region, conductive layers indicated by reference characters G1 and G2 are formed on a first main surface TSF1 of the first substrate TGB. The conductive layers G1 and G2 become gate electrodes of transistors configuring the first switch S10L and the second switch S11L. Hereinafter, each of the conductive layers G1 and G2 is also respectively referred to as gate electrode. In FIG. 15, a reference character GI indicates a gate insulating film. In the gate insulating film GI, semiconductor layers SMR5 and SMR4 are formed above the gate electrodes G1 and G2, and a semiconductor layer SMR2 functioning as a common drain region of the transistor is formed between the semiconductor layers SMR4 and SMR5. A semiconductor layer SMR1 is formed so as to sandwich the semiconductor layer SMR4 with the semiconductor layer SMR2 serving as the common drain region, and a semiconductor layer SMR3 is formed so as to sandwich the semiconductor layer SM5 with the semiconductor layer SMR2 serving as the common drain region.

The semiconductor layer SMR1 functions as a source region of the transistor configuring the second switch S11L, and the semiconductor layer SMR3 functions as a source region of the transistor configuring the first switch S10L. In FIG. 15, a reference character SI indicates an interlayer insulating film, the interlayer insulating film SI is provided with openings, a conductive layer E1 is connected to the semiconductor layer SMR1 via the opening, a conductive layer E2 is connected to the semiconductor layer SMR2 via the opening, and a conductive layer E3 is connected to the semiconductor layer SMR3 via the opening. Here, the conductive layer E1 configures the second line TSVL, and the conductive layer E3 configures the first line TPLL. In FIG. 15, a reference character PI indicates an organic film for flattening, the organic film PI is provided with an opening, and the conductive layer E2 is connected to a drive electrode TL formed on the organic film PI via the opening. A line pattern AU is formed on the drive electrode TL. In the first embodiment, the line pattern AU is formed on the drive electrode TL so that the line pattern AU and the drive electrode TL are ohmic-connected to each other by surface contact. Although not particularly limited, in the first embodiment, the drive electrode TL is preferably made of a transparent conductive material such as indium tin oxide (ITO), and the line pattern AU is preferably made of a material with a higher conductivity than that of the drive electrode TL. The line pattern AU preferably contains a metal such as aluminum. That is, the line pattern AU is preferably a metal such as aluminum or an alloy. The line pattern AU may also be made of a transparent conductive material such as ITO.

In FIG. 15, a reference character II indicates an insulating film. In the display region 2, a pixel electrode GDE is formed on the insulating film II. A liquid crystal layer shown in FIG. 1B is formed above the pixel electrode GDE. Note that the pixel electrode GDE is included in the above-described pixel Pix, and is connected to the signal line SL in a display period so that an image signal is supplied. In the display period, when the liquid crystal layer is displaced in accordance with a potential difference between the pixel electrode GDE and the drive electrode TL, images are displayed in accordance with the image signal.

FIG. 16 is a plan view showing a part of the display region 2 according to the first embodiment. FIG. 16A shows a plane in a portion of a drive electrode TL (e.g., TL(0) shown in FIG. 10) arranged to be far from the flexible cable FB2 (the respective ends of the lines TPLL, TPLR, TSVL, and TSVR) in a plan view. FIG. 16B shows a plane in a portion of a drive electrode TL (e.g., TL(p) shown in FIG. 10) arranged to be close to the flexible cable FB2 (the respective ends of the lines TPLL, TPLR, TSVL, and TSVR) in a plan view. In FIG. 15, a portion of the drive electrode TL shown on a right side of an arrow A-A' corresponds to the drive electrode TL shown in FIGS. 16A and 16B. In FIG. 15, a portion of the line pattern AU shown on the right side of the arrow A-A' corresponds to one line pattern AU of a plurality of line patterns AU shown in FIGS. 16A and 16B.

In FIG. 16, a region filled with dots indicates a pixel region corresponding to the above-described pixel Pix. In the present specification, the pixel region is described using the same reference character Pix as that of the pixel. In FIG. 16, only some of pixel regions are denoted with the reference character Pix. The pixel regions Pix are arranged in a matrix form in the display region 2 when viewed in a plan view, and each of the pixel regions Pix includes the pixel electrode GDE shown in FIG. 15. Each of the pixel regions Pix has a width PixX in the horizontal direction (first direction), and has a width PixY in the vertical direction (second direction). That is, the pixel regions Pix are periodically arranged with the width PixX as a pitch in the horizontal direction, and the pixel regions Pix are periodically arranged with the width PixY as a pitch in the vertical direction. In the present specification, each of the widths PixX and PixY is also referred to as a pitch of the pixel region Pix.

In FIG. 16, the line pattern AU is indicated as a region filled with positive slope lines. The line pattern AU extends in the same direction as that of the drive electrode TL and has a predetermined width AUB in a plan view. In the first embodiment, the line patterns AU are arranged in parallel to one another so as to overlap a boundary region between the pixel regions Pix adjacent to each other in the vertical direction when viewed in a plan view. In the drive electrode TL arranged to be far from the flexible cable FB2, a large number of line patterns AU are arranged for one drive electrode TL as shown in FIG. 16A. However, a distance (pitch) AUP between the line patterns AU arranged adjacent in parallel to each other is made the same as the pitch PixY between the pixel regions Pix.

On the other hand, as shown in FIG. 6B, the line patterns AU whose number of patterns are small for one drive electrode TL are arranged so as to overlap the drive electrode TL arranged to be close to the flexible cable FB2 in a plan view. Also in this case, the line patterns AU are also arranged so as to overlap a boundary region between the pixel regions Pix adjacent to each other in the vertical direction. Since the number of the arranged line patterns AU is small, a portion where the line patterns AU do not overlap the boundary region between the pixel regions Pix adjacent to each other in the vertical direction is caused when viewed in a plan view as shown in FIG. 16B. From a different viewpoint, a state obtained by excluding a state in which the line patterns AU are thinned from the state shown in FIG. 16A can be considered to be the state shown in FIG. 16B.

When the display region 2 is viewed in a plan view, note that a light shielding film (a black matrix) exists between the pixel regions Pix. When viewed in a plan view, the line patterns AU are arranged so as to overlap the light shielding film below the light shielding film. In FIG. 16, a reference character SL shown as a broken line indicates the signal line.

In the first embodiment, in the magnetic field touch detection, the respective numbers of the line patterns AU connected to the drive electrodes decrease in an order from the drive electrode connected to be far from the flexible cable FB2 (the respective ends of the lines TPLL, TPLR, TSVL, and TSVR) to the drive electrode connected to be close thereto. This manner can reduce the change in the detection sensitivity depending on the position in the magnetic field touch detection.

(Second Embodiment)

FIG. 17 is a plan view showing a part of a display region 2 according to a second embodiment. FIG. 17 is similar to FIG. 16, a reference character TL indicates a drive electrode, a region Pix filled with dots indicates a pixel region, and a reference character AU indicates a line pattern. Also in FIG. 15, a portion of the drive electrode TL shown on a right side of an arrow A-A' corresponds to a drive electrode TL shown in FIGS. 17A to 17C. In FIG. 15, a portion of the line pattern AU shown on the right side of the arrow A-A' corresponds to one line pattern AU of a plurality of line patterns AU shown in FIGS. 17A to 17C.

FIG. 17A is a plan view showing a drive electrode TL (e.g., TL(0) shown in FIGS. 9A, 9B and 10) arranged at a far end which is far from a flexible cable FB2 (an end of a line) and showing line patterns AU connected to the drive electrode TL. FIG. 17C is a plan view showing a drive electrode TL (e.g., TL(p) shown in FIGS. 9A, 9B and 10) arranged at a near end which is close to the flexible cable FB2 and showing line patterns AU connected to the drive electrode TL. Further, FIG. 17B is a plan view showing a drive electrode TL (e.g., TL(n) shown in FIGS. 9A and 9B) arranged at a position (referred to as "midpoint" for convenience) between the far end and the near end and showing line patterns AU connected to the drive electrode. Also in the second embodiment, as similar to FIG. 16, the line patterns AU are arranged so as to overlap a boundary region between the pixel regions Pix adjacent to each other in a vertical direction.

In the first embodiment, the respective numbers of the line patterns AU connected to the drive electrodes are set to decrease in the order from the drive electrode arranged to be far from the flexible cable FB2 (the end of the line) to the drive electrode arranged to be close thereto. On the other hand, in the second embodiment, the respective widths AUB of the line patterns AU connected to the drive electrodes decrease (narrow) in an order from the drive electrode arranged to be far from the flexible cable FB2 (the end of the line) to the drive electrode arranged to be close thereto.

As shown in FIG. 17A, the plurality of line patterns AU each having a predetermined width AUB1 are connected to the drive electrode TL arranged at the far end. On the other hand, the plurality of the line patterns AU each having a smaller width AUB3 than the width AUB1 are connected to the drive electrode TL arranged at the near end as shown in FIG. 17C. And, the plurality of the line patterns AU each having a width AUB2 between the width AUB1 and the width AUB3 are connected to the drive electrode TL arranged at the midpoint.

Regardless of a distance from the flexible cable FB2, respective thicknesses of the line patterns AU are the same as one another. Thus, respective areas where the line patterns AU connected to the drive electrodes are superimposed on the drive electrodes decrease in an order from the line patterns AU connected to the drive electrode TL arranged at the far end to the line patterns AU connected to the drive electrode arranged at the near end. Thus, respective resistances of the line patterns AU increase in an order from the line patterns AU connected to the drive electrode TL arranged at the far end to the line patterns AU connected to the drive electrode arranged at the near end. As a result, respective combined resistances of the drive electrodes increase in an order from the drive electrode arranged at the far end to the drive electrode arranged at the near end. Thus, as similar to the first embodiment, the change in the strength of the magnetic field generated in the magnetic field generation period depending on the position can be reduced, so that the position dependency of the detection sensitivity can be reduced.

In FIGS. 17A to 17C, the respective numbers of the line patterns AU connected to the drive electrode arranged at the far end, the drive electrode arranged at the midpoint, and the drive electrode arranged at the near end are made the same as one another. In other words, the respective numbers of the line patterns AU connected to one drive electrode are made the same as one another without depending on the position. However, the second embodiment may be combined with the first embodiment so as to change the number of the line patterns AU connected to one drive electrode.

(Third Embodiment)

Figure 18A:
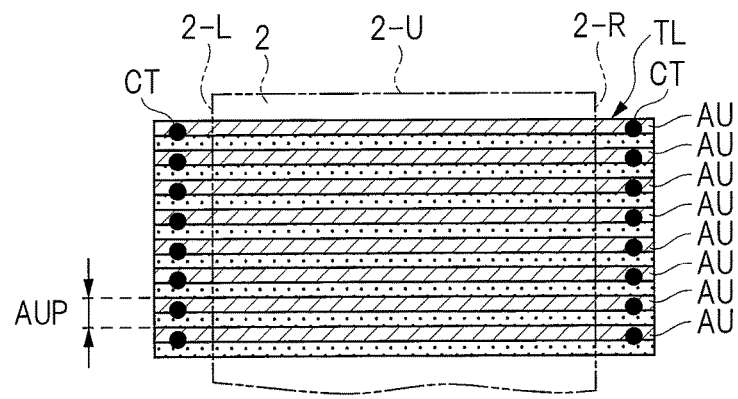
FIGS. 18A to 18C are plan views each showing a plane of a display apparatus according to a third embodiment.
Figure 18B:
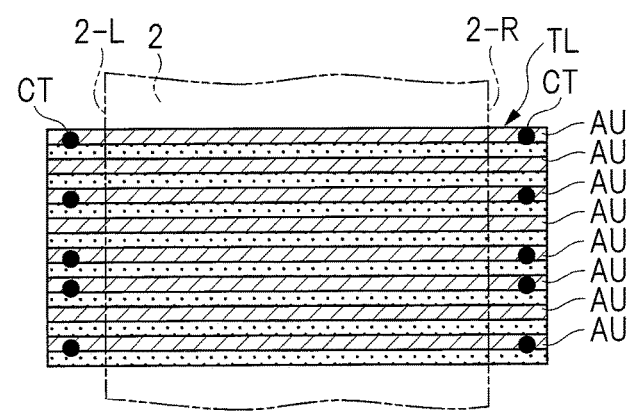
Figure 18C:
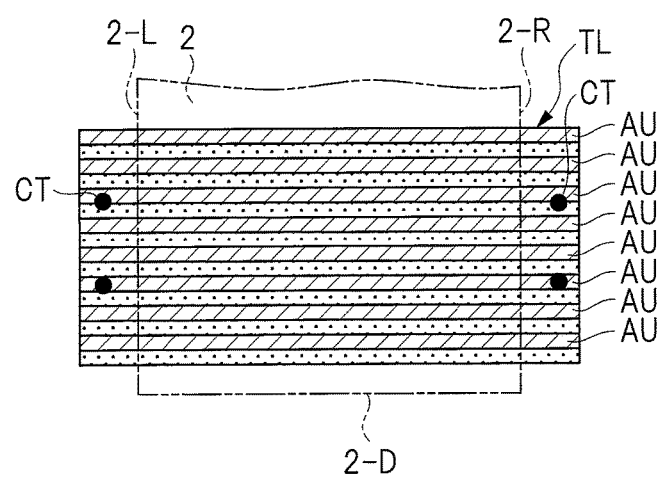

FIGS. 18A to 18C are plan views each showing a part of a plane of a display apparatus according to a third embodiment. Each of FIGS. 18A to 18C shows one drive electrode TL and a plurality of line patterns AU arranged so as to overlap this one drive electrode in a plan view. While the pixel region Pix shown in FIGS. 16A to 17C is omitted in FIGS. 18A to 18C, the display region 2 described with reference to FIGS. 4 and 5 is shown therein with a two dots and dash line. FIG. 18A is a plan view showing a drive electrode TL arranged at a far end which is far from a flexible cable FB2 and showing a plurality of line patterns AU arranged so as to overlap the drive electrode TL in a plan view. FIG. 18C is a plan view showing a drive electrode TL arranged at a near end which is close to the flexible cable FB2 and showing a plurality of line patterns AU arranged so as to overlap the drive electrode TL. Further, FIG. 18B is a plan view showing a drive electrode TL arranged at a midpoint between the far end and the near end and showing a plurality of line patterns AU arranged so as to overlap the drive electrode TL.

Also in the third embodiment, as similar to the first and second embodiments, the line patterns AU are arranged so as to overlap a boundary region between pixel regions adjacent to each other in a vertical direction. In the third embodiment, as different from the first embodiment, the line patterns AU are arranged in each of the drive electrodes so as to have the same pitch as the pitch (PixY in FIG. 16) of the pixel region in the vertical direction. That is, a distance between the line pattern AU arranged so as to overlap the drive electrode is the same as the pitch PixY between the pixel regions regardless of a distance from the flexible cable FB2 in a plan view. In explanation with the drive electrode TL arranged at the far end shown in FIG. 18A, the drive electrode TL arranged at the midpoint shown in FIG. 18B, and the drive electrode TL arranged at the near end shown in FIG. 18C as an example, the respective numbers of the line patterns AU overlapping the drive electrodes TL are the same as one another, and a pitch AUP between the adjacent line patterns AU is the same as the pitch PixY between the pixel regions.

As different from the second embodiment, the plurality of line patterns AU have the same width AUB and have the same cross section as one another.

In the first and second embodiments, the line patterns AU are formed on the drive electrode TL so that the drive electrode TL and the line patterns AU arranged so as to overlap the drive electrode TL are electrically connected to each other in surface contact as shown in FIG. 15. On the other hand, in the third embodiment, an insulating film is interposed between the drive electrode TL and the line patterns AU although described below. The drive electrode TL and the line patterns AU are selectively electrically connected to each other in a peripheral region of the display region 2.

In FIGS. 18A to 18C, each filled circle provided outside sides 2-L and 2-R of the display region 2 indicates a contact CT for electrically connecting the line pattern AU and the drive electrode TL. In the drive electrode TL arranged at the far end, an end of each of eight line patterns AU arranged so as to overlap the drive electrode TL is electrically connected to the drive electrode TL by the contact CT. On the other hand, in the drive electrode TL arranged at the near end, an end of each of two line patterns AU among the eight line patterns arranged so as to overlap the drive electrode TL is connected to the drive electrode TL by the contact CT as shown in FIG. 18C. Further, in the drive electrode TL arranged at the midpoint, an end of each of five line patterns AU among the eight line patterns AU arranged so as to overlap the drive electrode TL is connected to the drive electrode TL by the contact CT.

Thus, the respective numbers of the line patterns AU connected in parallel with the drive electrodes decrease in an order from the drive electrode arranged at the far end to the drive electrode arranged at the near end. As a result, respective combined resistances of the drive electrodes increase in an order from the drive electrode arranged at the far end to the drive electrode arranged at the near end, and the change in the strength of the generated magnetic field depending on the position can be reduced, so that the position dependency of the detection sensitivity can be reduced.

Figure 19:
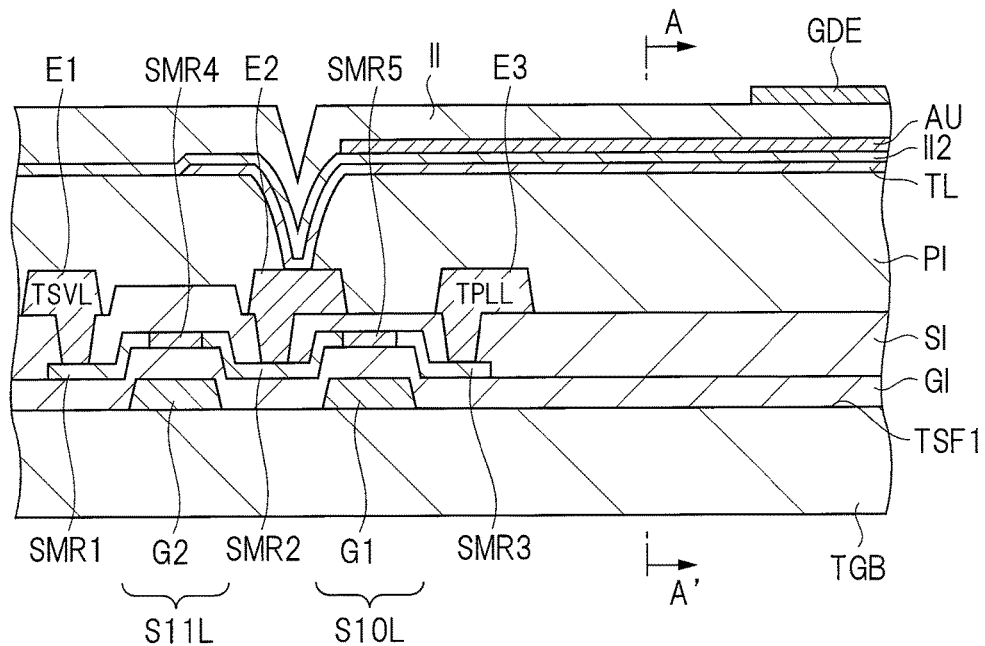
FIG. 19 is a cross-sectional view showing a cross section of the display apparatus according to the third embodiment.
Figure 20:
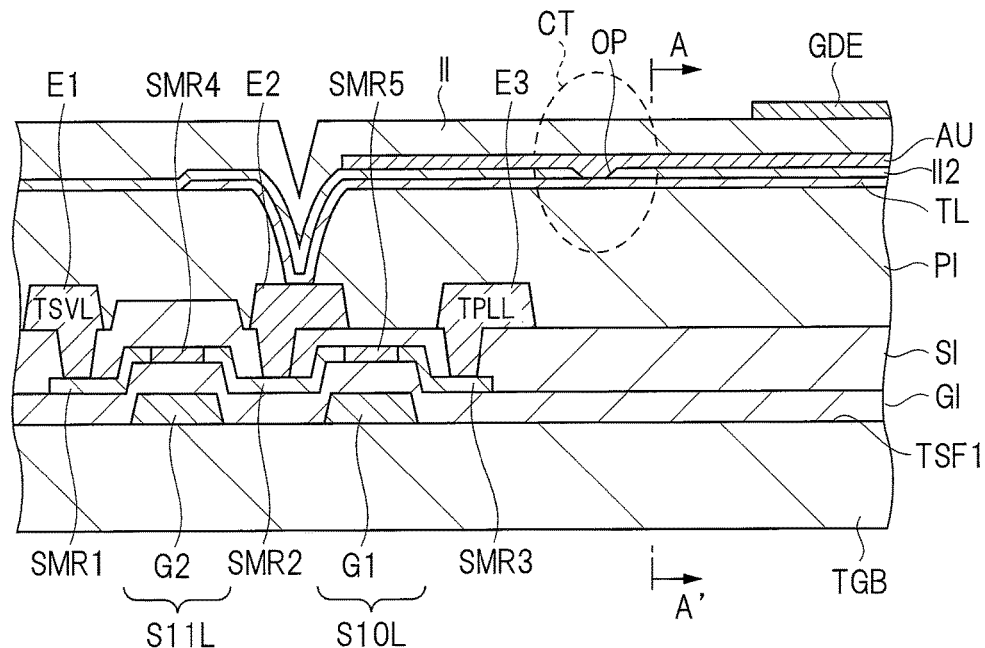
FIG. 20 is a cross-sectional view showing a cross section of the display apparatus according to the third embodiment.

FIGS. 19 and 20 are cross-sectional views each showing a cross section of the display apparatus according to the third embodiment. Each of FIGS. 19 and 20 shows a cross section of a portion closer to the side 2-L of FIG. 18. Here, FIG. 19 shows a cross section of a portion where the contact CT is not formed, and FIG. 20 shows a cross section of a portion where the contact CT is formed.

FIGS. 19 and 20 are similar to the above-described FIG. 15, and therefore, a difference therebetween will be described. In FIG. 15, the line pattern AU is formed on the drive electrode TL. That is, an ITO layer is formed in the organic film PI, the drive electrode TL is formed by the ITO layer, a conductive layer with a higher conductivity than that of the ITO layer is formed on the ITO layer, and the line pattern AU is formed by the conductive layer. On the other hand, in FIGS. 19 and 20, an insulating film II2 is formed on the ITO layer. A conductive layer with a higher conductivity than that of the ITO layer is formed on the insulating film II2, and the line pattern AU is formed by the conductive layer.

In FIG. 20, an opening OP is formed in the insulating film II2 in the peripheral region outside the side 2-L in order to electrically connect the drive electrode TL and the line pattern AU. A conductive layer forming the line pattern AU is connected to the drive electrode TL via the opening OP. In FIG. 19, a contact CT for connecting the drive electrode TL and the line pattern AU is not formed, and therefore, the opening OP is not formed.

In each of a plurality of drive electrodes (TL(0) to TL(p) shown in FIGS. 9A, 9B and 10) arranged from a far end to a near end, a desired number of line patterns (first line patterns) AU are selected from a plurality of line patterns (an entire line pattern) AU arranged so as to overlap the drive electrode, and the opening OP is formed in the insulating film II2 so that both ends of the selected line patterns AU are connected to the drive electrode. Thus, the selected number of line patterns AU is connected in parallel to the drive electrode. The desired number of line patterns at this time is determined so that respective total combined resistances of current paths formed in the magnetic field generation period are equal or nearly equal to one another.

For example, a first number of line patterns AU are selected as the line patterns AU to be connected to the drive electrode (e.g., TL(p)) arranged at the near end, and the selected first number of line patterns AU are connected to the drive electrode TL(p) via the opening OP. At this time, the number of line patterns AU connected to the drive electrode (e.g., TL(0)) arranged at the far end is a second number larger than the above-described first number. The second number of line patterns AU is connected to the drive electrode TL(0) via the opening OP. Accordingly, the line patterns AU connected to the drive electrode TL(p) arranged at the near end can be made less than the line patterns AU connected to the drive electrode TL(0) arranged at the far end. As a result, the total combined resistance of the current path including the drive electrode TL(p) and the total combined resistance of the current path including the drive electrode TL(0) can be made equal to each other.

In the third embodiment, the plurality of line patterns AU having the same planar shape as one another are periodically arranged in the display region 2 as the entire line pattern AU. The line pattern AU is formed by, for example, etching the conductive layer with the higher conductivity than that of the ITO layer. When the line patterns AU are periodically formed, respective etching amounts for the line patterns AU can be made equal to one another. Therefore, variation in manufacture the line patterns AU can be suppressed. The flattening can be achieved because the line patterns are periodically arranged.

At this time, the respective line densities of the line patterns AU are equal to one another on the entire surface of the display region 2. That is, respective total areas of the superimposed line patterns AU per the drive electrode are substantially equal to one another in all drive electrodes.

When viewed in a plan view, the plurality of line patterns AU are arranged on the entire surface of the display region 2 so as to be, for example, equally spaced apart from one another, and therefore, have an equal line density to one another. The plurality of line patterns AU arranged on the entire surface of the display region 2 become the entire line pattern. When viewed in a plan view, the predetermined number of line patterns AU among the line patterns AU overlapping (superimposed on), for example, one drive electrode is electrically connected to the superimposed drive electrode via the opening OP. At this time, when viewed in a plan view, there are the line patterns AU which are superimposed on the drive electrode but are not electrically connected to the drive electrode via the opening OP. When viewed in a plan view, the line pattern AU superimposed on the drive electrode and electrically connected to the drive electrode is considered to be a first line pattern, and the line pattern AU superimposed on the drive electrode but not electrically connected to the drive electrode is considered to be a second line pattern.

When the line patterns AU are considered as described above, the sum of the number of first line patterns and the number of second line patterns become the same between the drive electrode arranged at the near end and the drive electrode arranged at the far end. Since the respective areas of the plurality of line patterns are equal to one another, the area of the line patterns AU superimposed on the drive electrode arranged at the near end, i.e., the total area of the first line pattern and the second line pattern at the near end becomes substantially equal to the area of the line pattern AU superimposed on the drive electrode arranged at the far end (the total area of the first line pattern and the second line pattern at the far end). The line patterns are formed in the same layer.

In the first and third embodiments, the respective numbers of the line patterns AU connected to the drive electrodes decrease in an order from the drive electrode connected at the position which is far from the flexible cable FB2 (the end of the line) to the drive electrode connected at the position which is close thereto. In the second embodiment, the respective cross-sectional areas of the line patterns AU connected to the drive electrodes decrease in an order from the drive electrode connected at the far position to the drive electrode connected at the close position. That is, in these embodiments, the respective line numbers of the line patterns AU connected to the drive electrodes decrease in an order from the drive electrode connected at the far position to the drive electrode connected at the close position. When the line number of the line patterns AU connected to each of the drive electrodes is considered to be the line density of the line patterns AU per the drive electrode, the respective line densities of the line patterns AU per the drive electrodes decrease in an order from the drive electrode connected at the far position to the drive electrode connected at the close position. For example, the line density of the line patterns AU connected to the drive electrode connected at the close position becomes smaller than the line density of the line patterns AU connected to the drive electrode connected at the far position.

In the embodiment, by the adjustment of the line density of the line patterns AU per the drive electrode in the plurality of drive electrodes arranged in the display region 2, the change in the strength of the generated magnetic field depending on the position can be reduced. Thus, the position dependency of the detection sensitivity can be reduced while expansion of a frame edge on the long side of the module 500 is suppressed.

Within the scope of the concept of the present invention, various modified examples and alteration examples could have been easily thought up by those who skilled in the art, and it would be understood that these various modified examples and alteration examples belong to the scope of the present invention.

For example, the ones obtained by appropriate addition, removal, or design-change of the components to/from/into each of the above-described embodiments by those who skilled in the art or obtained by addition, omitting, or condition-change of the step to/from/into each of the above-described embodiments are also within the scope of the present invention as long as they include the concept of the present invention.

For example, the explanation has been made in the case in which the lines TPLL, TPLR, TSVL, and TSVR extend in the vertical direction, and in which the drive electrodes TL(0) to TL(p) extend in the horizontal direction and are arranged in parallel to one another in the vertical direction. However, the vertical direction and the horizontal direction change depending on a viewpoint. Even if the respective extending directions of the lines and the drive electrodes are changed by changing the viewpoint, the change is included in the scope of the present invention. The term "parallel" used in the present specification means extension from one end to the other end without crossing. Thus, even if a part or whole of one line (or electrode) is provided while being inclined to the other line (or electrode), this state also means being "parallel" in the present specification unless the lines cross each other from one end to the other end.

What is claimed is:

1. An input detection device comprising:
   a substrate;
   a line having an end connected to a driving signal circuit which supplies a driving signal and extending in a first direction on the substrate;
   a plurality of drive electrodes arranged in the first direction on the substrate;
   a selecting drive circuit provided between the line and the plurality of drive electrodes, one side of the selecting drive circuit connected to the line, and another side of the selecting circuit connected to the plurality of the drive electrodes; and
   a plurality of first line patterns superimposed on each of the plurality of drive electrodes in a plan view and electrically connected to the drive electrode,
   wherein a line density of the first line patterns connected to the drive electrode which is close to the end of the line connected to the driving signal circuit is smaller than a line density of the first line patterns connected to the drive electrode which is far from the end of the line connected to the driving signal circuit.

2. The input detection device according to claim 1,
   wherein each of the plurality of first line patterns has a shape extending in a second direction intersecting the first direction in a plan view.

3. The input detection device according to claim 2,
   wherein the line density of the first line patterns is made small by connecting the first line patterns, whose number of line patterns are smaller than a number of the first line patterns connected to the drive electrode connected to be far from the end of the line, to the drive electrode connected to be close to the end of the line.

4. The input detection device according to claim 2,
   wherein the line density of the first line patterns is made small by connecting the first line patterns, whose area is smaller than an area of the first line patterns connected to the drive electrode connected to be far from the end of the line, to the drive electrode connected to be close to the end of the line.

5. The input detection device according to claim 2,
   wherein the input detection device further includes second line patterns not connected to the plurality of drive electrodes,
   the second line patterns are arranged to be in the same layer as the first line patterns and to be parallel to the first direction, and
   a total area of the first line patterns overlapping the drive electrode in a plan view and the second line patterns is substantially equal between the drive electrode arranged to be close to the end of the line and the drive electrode arranged to be far from the end of the line.

6. The input detection device according to claim 5,
   wherein the input detection device further includes:
   a drive electrode; and
   an insulating film interposed between the first line patterns and the second line patterns,
   wherein the first number of first line patterns are connected to the drive electrode connected to be close to the end of the line by an opening formed in the insulating film, and
   a second number of the second line patterns whose number is larger than the first number are connected to the drive electrode connected to be far from the end of the line by the opening formed in the insulating film.

7. The input detection device according to claim 2,
   wherein the plurality of first line patterns oppose the plurality of drive electrodes so as to overlap the drive electrode to be connected in a plan view.

8. The input detection device according to claim 2,
   wherein, when it is detected that the external object is close based on the change in the magnetic field, the plurality of drive electrodes adjacent to each other in a plan view are selected from the plurality of drive electrodes, and are connected to the line.

9. The input detection device according to claim 8,
   wherein the smaller number of drive electrodes are selected and are connected to the line when it is detected that the external object is close based on change in an electric field than when it is detected that the external object is close based on the change in the magnetic field.

10. The input detection device according to claim 1,
    wherein the input detection device further includes:
    a plurality of detection electrodes arranged so as to intersect the plurality of drive electrodes in a plan view, and
    the change in the magnetic field caused when the external object is close is detected by the plurality of detection electrodes.

11. The input detection device according to claim 1,
    wherein the first line pattern is made of a metal.

* * * * *